(12) United States Patent
Schulte, Jr. et al.

(10) Patent No.: US 6,601,709 B2
(45) Date of Patent: Aug. 5, 2003

(54) SCREEN SUPPORT AND SCREENS FOR SHALE SHAKERS

(75) Inventors: David L. Schulte, Jr., Broussard, LA (US); Guy L. McClung, III, Spring, TX (US)

(73) Assignee: Tuboscope I/P, Inc., Houston, TX (US)

( * ) Notice: Subject to any disclaimer, the term of this patent is extended or adjusted under 35 U.S.C. 154(b) by 0 days.

(21) Appl. No.: 10/036,742

(22) Filed: Dec. 21, 2001

(65) Prior Publication Data

US 2002/0139724 A1 Oct. 3, 2002

Related U.S. Application Data

(63) Continuation-in-part of application No. 09/390,231, filed on Sep. 3, 1999, now Pat. No. 6,325,216.

(51) Int. Cl.$^7$ .................................................. B07B 1/46
(52) U.S. Cl. ....................... 209/397; 209/313; 209/405; 209/412
(58) Field of Search ................................ 209/412, 408, 209/405, 397, 399, 313

(56) References Cited

U.S. PATENT DOCUMENTS

| | | | |
|---|---|---|---|
| 321,881 A | * 7/1885 | Atwell et al. | ................ 209/391 |
| 583,981 A | 6/1897 | Cunningham et al. | |
| 599,468 A | 2/1898 | Cross | |
| D29,933 S | 1/1899 | Hodge | |
| 696,870 A | * 4/1902 | Kessler | ......................... 209/37 |
| 703,887 A | * 7/1902 | Anderson | .................... 209/373 |
| 1,067,263 A | * 7/1913 | McLean | ..................... 209/397 |
| 1,082,612 A | 12/1913 | Smith et al. | |
| 1,438,783 A | 12/1922 | Pessell | |
| 1,561,632 A | 11/1925 | Woodward | |
| 2,089,548 A | 8/1937 | Frantz et al. | |
| 2,190,262 A | 2/1940 | Geist | |
| 2,274,700 A | * 3/1942 | Jenks | ......................... 209/401 |

(List continued on next page.)

FOREIGN PATENT DOCUMENTS

| | | | | |
|---|---|---|---|---|
| AU | 205151 | * | 7/1955 | ................. 209/397 |
| DE | 647078 | * | 6/1937 | ................. 209/397 |
| DE | 2634934 | * | 11/1977 | ................. 209/397 |
| EP | 0 169 698 | | 1/1986 | |
| GB | 457924 | | 12/1936 | |
| GB | 1 106 513 | | 3/1968 | |
| GB | 2 113 121 A | | 8/1983 | |
| SU | 973190 | * | 11/1982 | ................. 209/397 |

OTHER PUBLICATIONS

HK Perforated Materials, Harrington & King Perforating Co., Catalog 105, pp. front page, 24, 31, 121–124, 1988.
LM–3 Full –Flo Shale Shaker, Sweco Oilfield Services, 1991.
Mud Equipment Manual: Handbook 3: Shale Shakers, Gulf Publishing Co., Jan. 1976.

*Primary Examiner*—Donald P. Walsh
*Assistant Examiner*—Daniel K Schlak
(74) *Attorney, Agent, or Firm*—Guy McClung

(57) ABSTRACT

A support for a screen assembly for a vibratory separator, a screen assembly with such a support, a vibratory separator with one or more such screen assemblies, and a method of using such a screen assembly, such a support having a body, a first series of holes through the body each hole having a first opening size as viewed from above, a second series of holes through the body each hole with a second opening size as viewed from above, the second series of holes at a selected area of the body and the support positionable in a vibratory separator so that the selected area is adjacent a selected location with respect to the vibratory separator, and the second opening size smaller than the first opening size and/or the second series of holes with holes spaced apart differently than the holes of the first series of holes; and in one aspect, a plastic grid with such hole series for fusing together layers of screening material.

28 Claims, 18 Drawing Sheets

U.S. PATENT DOCUMENTS

| | | | | |
|---|---|---|---|---|
| 3,080,860 A | * | 3/1963 | Riccio | 125/26 |
| 3,390,771 A | | 7/1968 | Wehner | |
| 3,716,138 A | | 2/1973 | Lumsden | 209/401 |
| 3,900,628 A | | 8/1975 | Stewart | 428/134 |
| 4,062,769 A | | 12/1977 | Simonson | 209/399 |
| 4,140,630 A | | 2/1979 | Scarlett et al. | 209/313 |
| 4,237,000 A | | 12/1980 | Read et al. | 209/319 |
| 4,491,517 A | | 1/1985 | Janovac | 209/401 |
| 4,563,270 A | * | 1/1986 | Wolff | 209/379 |
| 4,575,421 A | | 3/1986 | Derrick et al. | 209/397 |
| 4,691,744 A | | 9/1987 | Haver et al. | 139/425 R |
| 4,696,751 A | | 9/1987 | Eifling | 210/780 |
| 4,819,809 A | | 4/1989 | Derrick | |
| 5,256,291 A | | 10/1993 | Cagle | 210/499 |
| 5,256,292 A | | 10/1993 | Cagle | 210/499 |
| 5,330,057 A | | 7/1994 | Schiller et al. | 209/392 |
| 5,392,925 A | * | 2/1995 | Seyffert | 209/405 |
| 5,417,858 A | | 5/1995 | Derrick et al. | 210/388 |
| 5,417,859 A | | 5/1995 | Bakula | 210/388 |
| 5,783,077 A | | 7/1998 | Bakula | 210/388 |
| 5,814,218 A | | 9/1998 | Cagle | 210/388 |
| 5,816,413 A | | 10/1998 | Boccabella et al. | 209/399 |
| 5,927,511 A | | 7/1999 | Riddle et al. | 209/405 |
| 5,944,197 A | * | 8/1999 | Baltzer et al. | 209/400 |
| 5,944,993 A | | 8/1999 | Derrick et al. | 210/388 |
| 6,000,556 A | | 12/1999 | Bakula | 210/388 |
| 6,032,806 A | * | 3/2000 | Leone et al. | 209/402 |
| 6,053,332 A | | 4/2000 | Bakula | 210/388 |
| 6,241,098 B1 | * | 6/2001 | Schulte et al. | 209/401 |

* cited by examiner

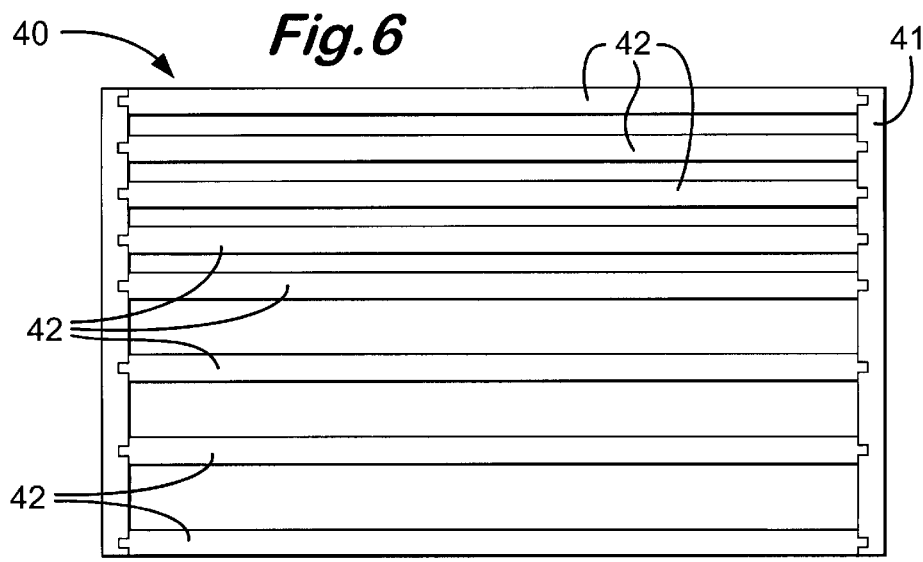
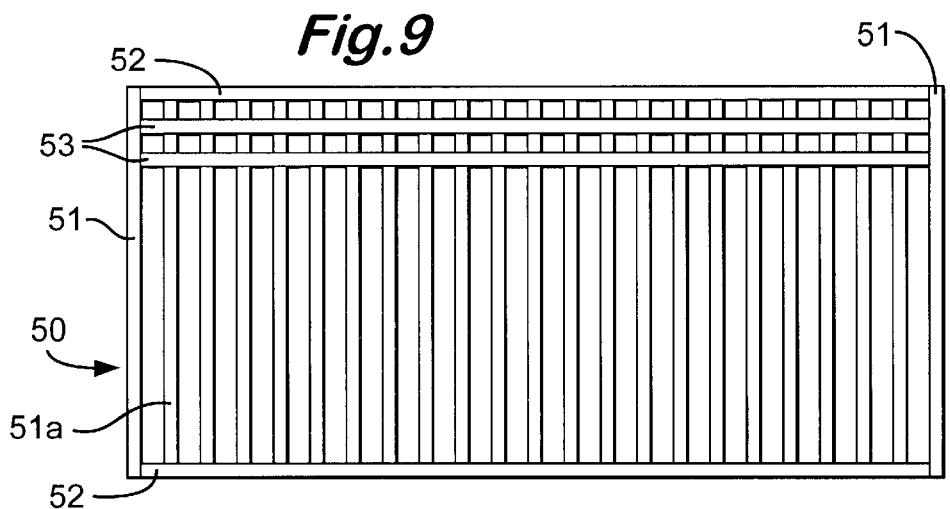
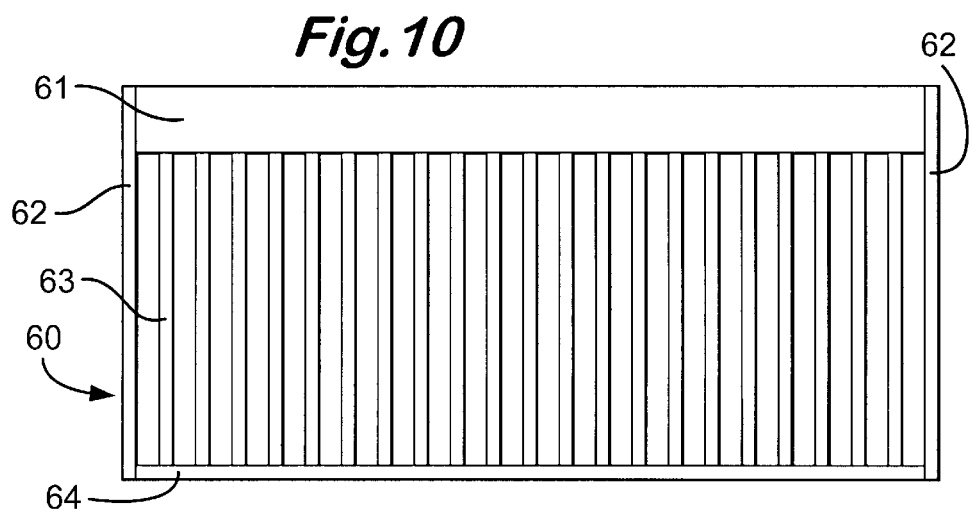

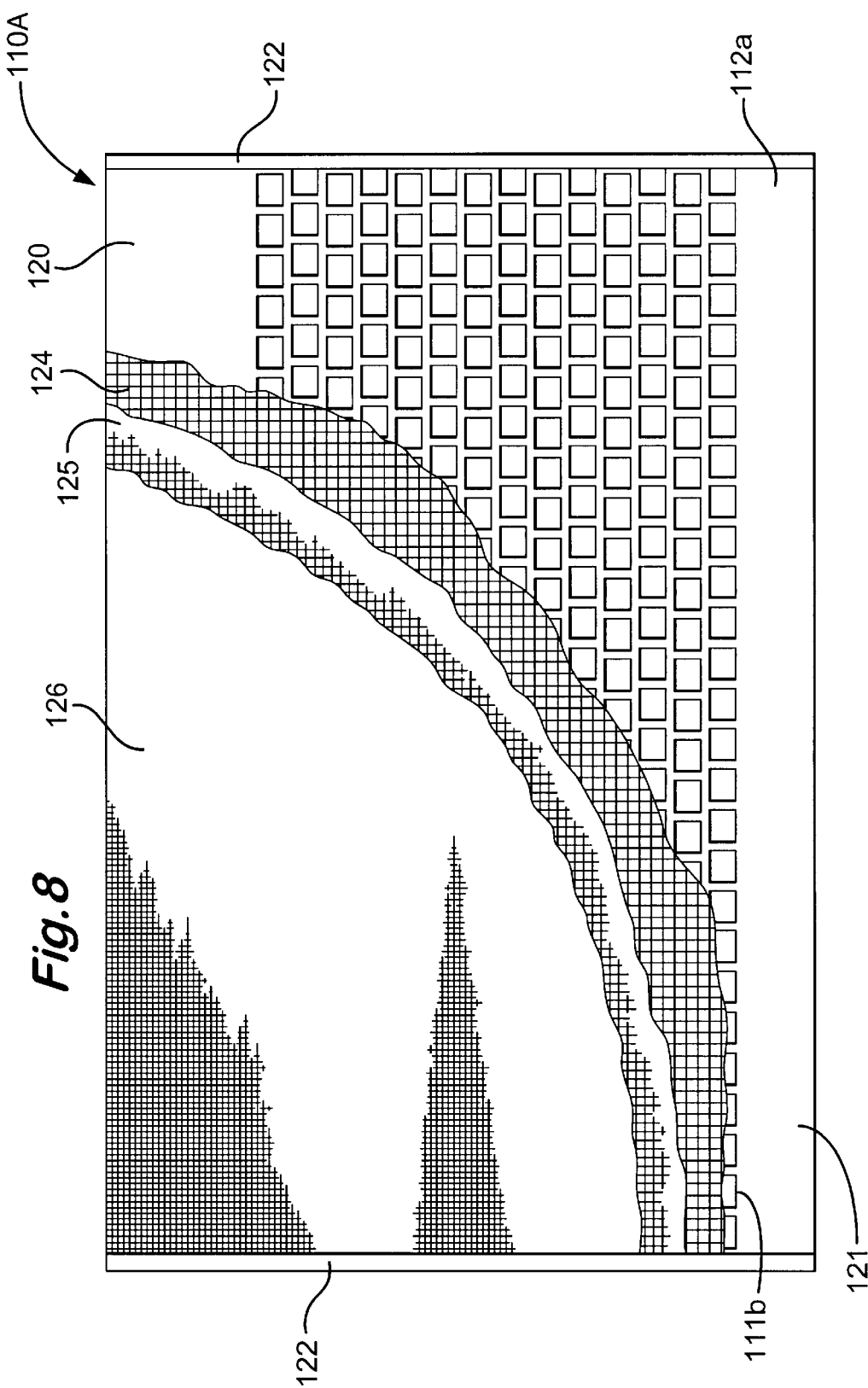

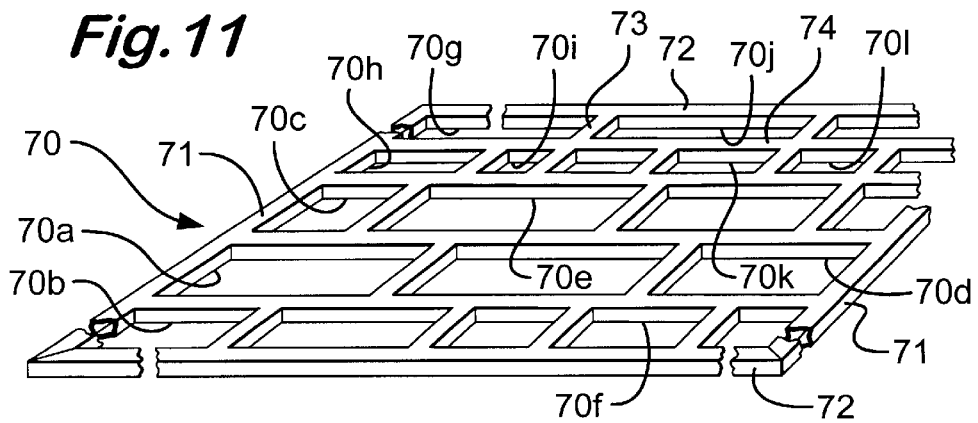
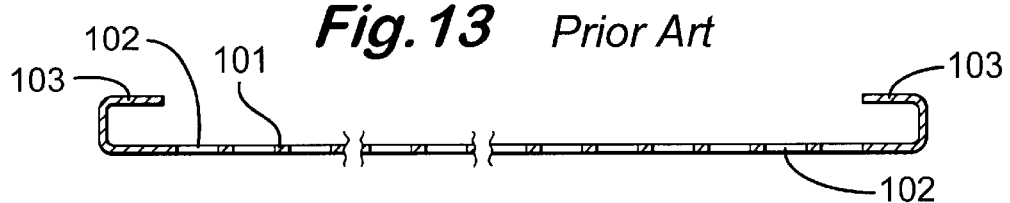
Fig. 13 Prior Art
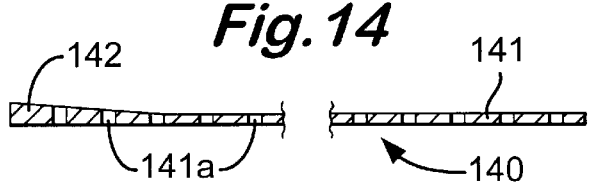
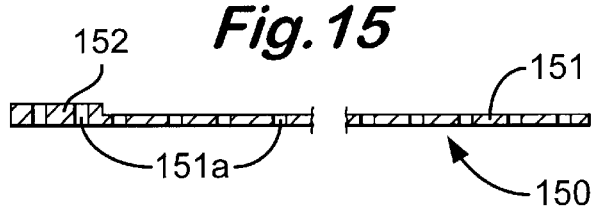
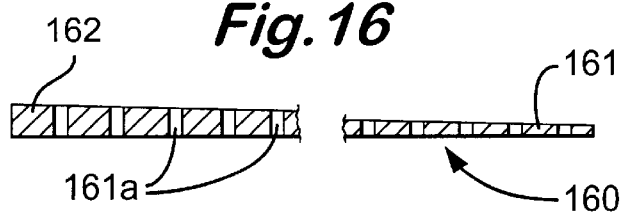

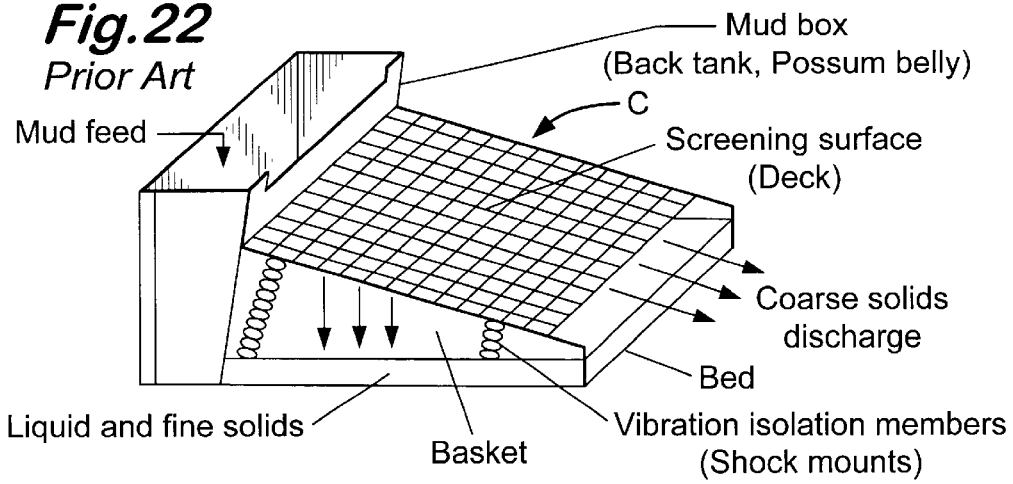
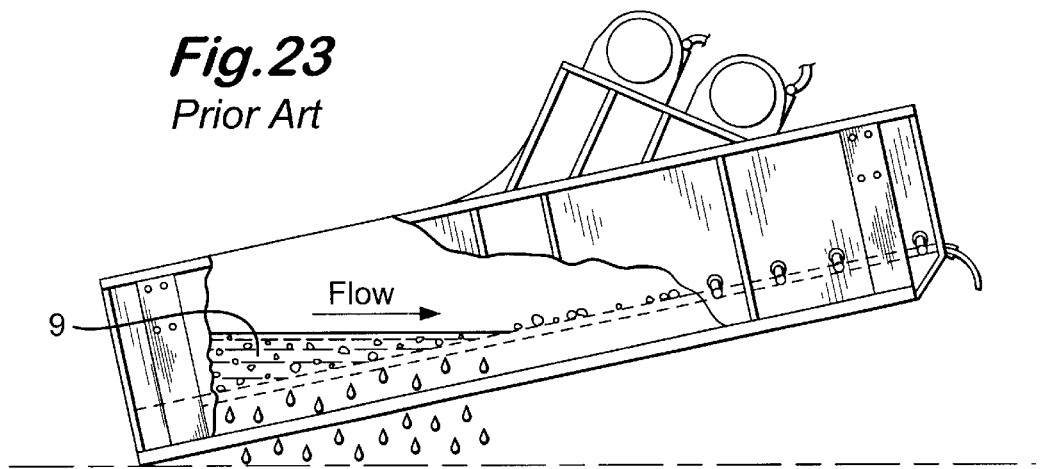
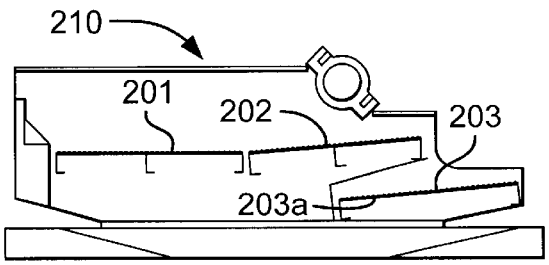
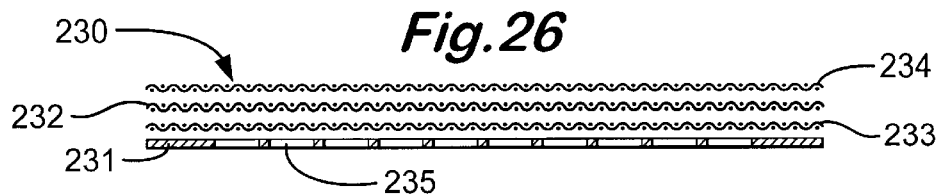

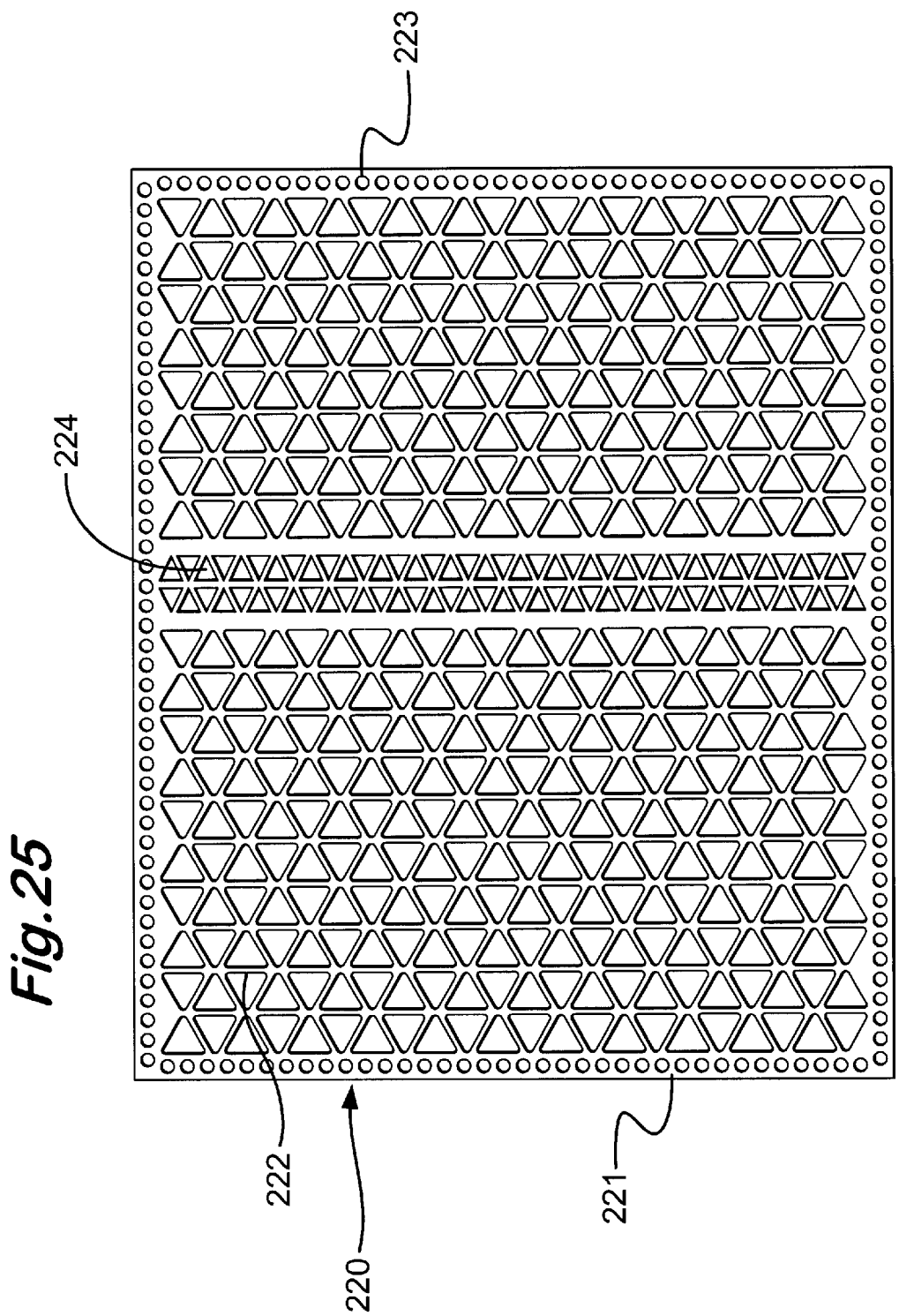

SCREEN SUPPORT AND SCREENS FOR SHALE SHAKERS

RELATED APPLICATION

This is a continuation-in-part of U.S. application Ser. No. 09/390,231 filed Sep. 3, 1999 issued as U.S. Pat. No. 6,325,216 on Dec. 4, 2001, both the application and the patent incorporated fully herein for all purposes.

BACKGROUND OF THE INVENTION

1. Field of the Invention

The present invention is directed to screens for vibratory separators and shale shakers, supports for such screens, vibratory separators and shale shakers with such screens, and methods of using such supports, screens, separators, and shakers.

2. Description of Related Art

Vibratory separators are used in a wide variety of industries to separate materials such as liquids from solids or solids from solids. Typically such separators have a basket or other screen holding or mounting apparatus mounted in or over a receiving receptacle or tank and vibrating apparatus for vibrating the basket. One or more screens is mounted in the basket. Material to be treated is introduced to the screen(s) either by flowing it directly onto the screen(s) or by flowing it into a container, tank, or "possum belly" from which it then flows to the screen(s). Also in some multi-screen apparatuses material flows from an upper screen onto a lower screen.

Often there is wear in the area at which material is first introduced to a screen. Fluid alone and/or abrasive and solids in some fluids can wear away parts of a screen in the material introduction area. Such wear can cause so much damage to a screen that, although the remainder of the screen is serviceable, the screen must be repaired or replaced.

Referring now to FIG. 20, a prior art shale shaker 1 has a screen 2 (with screen or screening cloth or mesh as desired) mounted on vibratable screen mounting apparatus or "basket" 3. The screen 2 may be any known screen or screens. The basket 3 is mounted on springs 4 (only two shown; two as shown are on the opposite side) which are supported from a frame 6. The basket 3 is vibrated by a motor 5 and interconnected vibrating apparatus 8 which is mounted on the basket 3 for vibrating the basket and the screens. Elevator apparatus 7 provides for raising and lowering of the basket end. Typically the basket will be in a "climb the hill" position (e.g., see FIG. 23) so that a pool 9 of liquid is maintained at one end within the basket.

FIG. 21 discloses one example of a typical prior art shaker system (e.g. as shown in U.S. Pat. No. 5,190,645 incorporated fully herein for all purposes). The system A has a shale shaker K having a screen or screens S. The screen(s) S are mounted in a typical shaker basket B and one or more vibrators V (any known suitable shaker vibrator) vibrate the basket B and hence the screen(s) S. The other components of the system A are as described in U.S. Pat. No. 5,190,645.

FIG. 22 shows schematically a prior art system C with a Mud Box (Back tank, Possum Belly) to distribute the flow to a screening surface. The screens are mounted in a Deck (Basket) which is vibrated to assist the throughput of mud and movement of separated solids. The deck rests on Vibration Isolation Members, such as helical springs or rubber mounts. The vibration isolation members rest on the support member, which is also used to divert flow as desired, and is called a Bed. There are many deck, basket configurations used depending on the design criteria. The deck and basket, may be flat, horizontal, or mounted at a slope.

On sloped deck units (e.g. cascade or parallel flow), the screens may be continuous with one screen covering the entire deck length, or have a divided deck which has more than one screen used to cover the screening surface, or with individual screens mounted at different slopes. On multiple deck units, more than one screen layer may be employed. In a two or three deck unit, the material, fluid, drilling fluid, or mud passes through one screen before flowing through the second.

There is a need, recognized by the present inventors, for an efficient and effective screen support and screen for vibratory separator systems which does not wear excessively at the area of material introduction. There is a need, recognized by the present inventors, for an efficient and cost-effective screen support and screens with such a support that reduce wear in material introduction areas and which need not be repaired or replaced as frequently as certain prior art screens.

SUMMARY OF THE PRESENT INVENTION

The present invention, in certain aspects, discloses a support for a screen assembly for a vibratory separator or a shale shaker, the support having a body, a first series of holes (or openings) through the body, each of the first series of holes having a first opening size as viewed from above, a second series of holes (or openings) through the body, each of the second series of holes having a second opening size as viewed from above, the second series of holes at a selected area of the body (e.g., a material introduction area or a material exit area) and the support positionable in a vibratory separator or shale shaker so that the selected area is adjacent a selected location with respect to the vibratory separator shale shaker (e.g., at an area of material introduction and/or material exit), and the second opening size smaller than the first opening size, and/or in certain aspects the holes or openings of the second series different in shape (as viewed from above) than the shape of the holes of the first series as viewed from above; and/or the holes or openings of the second series spaced-apart with a different spacing than spacing apart of the holes or openings of the first series. The present invention also discloses a screen assembly with such a support. The present invention also discloses a plastic grid for a screen assembly with such holes or openings.

The present invention discloses, in at least certain aspects, a support for a screen or screen assembly for a shale shaker or other vibratory separator. Such a support has at least two areas, including a first areas with a series of typical holes, perforations, or openings as in various prior art screens and screen assemblies; and at least one second area located at a material introduction area in which the holes, etc. are smaller than the holes, etc. in the first area and/or in which the holes, etc. are spaced further apart from each other than are the holes, etc. in the first area. Thus, in certain aspects of the present invention, there is more structure and/or mass in the second area than in the first area so that the second area does not wear as quickly as it would if its holes, etc. were like the holes, etc. of the first area. In one aspect the support is one integral piece with different holes and/or holes with different size and/or holes with different shapes and/or holes spaced differently; and, in other aspects, the support is a primary piece with one or more secondary pieces thereon whose effect is to produce a the different holes etc.

A shaker, in one embodiment according to the present invention, e.g. with basic components as the shaker in FIG. 20, is, according to the present invention, provided with one or more screens as described herein according to the present invention.

Screens according to certain aspects of the present invention may be made with plastic grids with holes, etc. that correspond to the holes, etc. of a support according to the present invention. In one aspect, the effective opening size of holes or openings at a fluid introduction area of a screen assembly is reduced by adding plastic, glue, epoxy and/or other adhesive around the holes in the fluid introduction area, thus strengthening this area. Also, such material can cross over and/or extend within and/or line the sides of a hole or opening in a support. In another aspect, the different holes, etc. are produced by a pattern of hot melt glue.

In certain aspects, supports according the to the present invention have more mass and/or more structural members at areas of fluid or material introduction to counter wear in those areas.

When a basket in a shaker has one elevated end (as shown in FIG. 23) so that the separated solids run "uphill", liquid is prevented from running off the screen's exit end; and a pool of liquid can be formed at the basket's opposite end. Teachings of the present invention for material introduction areas can also be used at the screen areas beneath such a pool.

The present invention, in one embodiment includes a shale shaker with a frame; a "basket" or screen mounting apparatus in the frame; one or more screens according to the present invention with supports according to the present invention in the basket; basket vibrating apparatus; and a collection tank or receptacle below the basket. In one particular aspect such a shale shaker treats drilling fluid.

The present invention discloses, in certain aspects, a method for reducing the wear on certain screen areas by using a screen or screens according to the present invention with screen supports according to the present invention.

It is, therefore, an object of at least certain preferred embodiments of the present invention to provide:

New, useful, unique, efficient, non-obvious screen supports for screens for vibratory separators and shale shakers and methods for using them to separate components of material to be treated thereby;

Such screen supports, and screens therewith, in which openings through a screen support are smaller and/or spaced closer together at a fluid introduction area than other openings through the screen support;

Such screen supports, and screens therewith, with one or more areas of increased mass and/or with relatively more structural members;

Such screen supports, and screens therewith, with an area or areas for initially receiving material to be treated, such areas with fewer holes, etc. than other areas of the screen support;

Such screen supports, and screens therewith, in which the effective opening size of openings at a fluid introduction are reduced compared to other openings of the support;

Such screen supports in which effective opening size at a fluid introduction area is reduced by superimposing an additional member with openings therethrough over part of a support at a fluid introduction area;

Such screens made with a plastic grid with holes, etc. corresponding to holes, etc. in a screen support according to the present invention;

Screens with one or more areas of tighter mesh at an area of expected excessive wear, e.g. at a material introduction and/or at an area of material exit; and A system with any such screen support that has relatively increased screen life.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 6 is a top view of a screen support according to the present invention.

FIGS. 7 and 8 are top views of screens according to the present invention.

FIGS. 9 and 10 are top views and

FIG. 11 is a perspective view of screen supports according to the present invention.

FIG. 13 is a cross-section view along line 13—13 of FIG. 12.

FIGS. 14–16 are cross-section views of screen supports according to the present invention.

FIG. 18 is a perspective view of and

FIG. 22 is a schematic view of a prior art shaker.

FIG. 23 is a side view of a prior art basket for a shaker as shown in FIG. 20.

FIG. 24 is a side view of a shale shaker with a screen according to the present invention.

FIG. 25 is a top view of screen support according to the present invention.

FIG. 26 is an exploded cross-sectional view of a screen according to the present invention.

DESCRIPTION OF EMBODIMENTS PREFERRED AT THE TIME OF FILING FOR THIS PATENT

Figure 1:
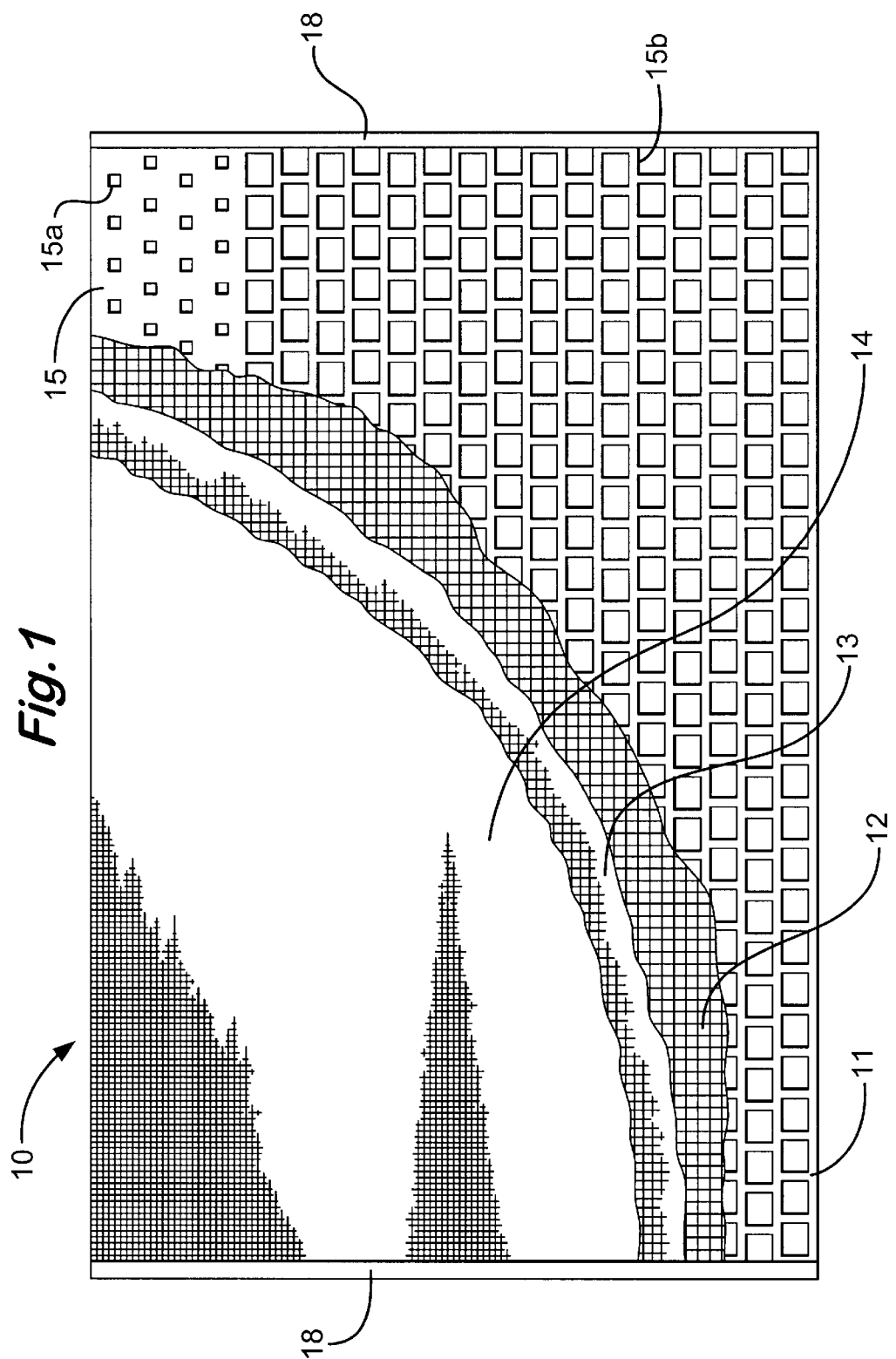
FIGS. 1–5 are top views of screens according to the present invention.

FIG. 1 shows a screen 10 according to the present invention which has a perforated plate 11 on which are mounted three layers 12, 13, and 14 of mesh or screening material. Any of the layers may be deleted. The plate 11 has hookstrips 18 on two of its sides for mounting the screen 10 is suitable shale shakers or vibratory separators. Optionally, the hookstrips are deleted (as may be done with the screens of FIGS. 2–4) and/or the screening material is mounted on a frame or strip support instead of the plate 11. The screen 10 may be like a screen disclosed in U.S. Pat. Des. No. 366,040 (incorporated fully herein for all purposes) and U.S. Pat. No. 5,971,159 (incorporated fully herein for all purposes), but with the holes in the plate 11 as described below.

The plate 11 has a series of holes or openings 15b therethrough which extend over a substantial portion of the plate's entire area. An area 15 of the plate 11 which extends from one side of the plate to the other has a series of holes or openings 15a therethrough. Although part of the plate is covered by the screen mesh layers as viewed in FIG. 1, it is to be understood that the holes 15b extend across the surface of the plate 11 from one side thereof to the other as do the holes 15a (and as do holes in FIGS. 2–4). In certain aspects a hole 15a has an opening area (as viewed from above as shown in FIG. 1) which is between 25% and 75% of the area of a hole 15b. Also, in certain aspects the distance between holes 15a is between 25% and 75% greater than the distance between holes 15b. These ranges for hole size and hole spacing may apply for holes of any screen disclosed herein. The layers 12–14 may be any known screening and/or mesh layers connected together or bonded together in any known way (as may be the case for the layers of any screen according to the present invention described herein). The holes 15a (as is the case with any series of smaller holes and/or holes with different between-hole spacing disclosed herein) may be located at a fluid introduction area of the screen 10 when it is mounted in a vibratory separator or shale shaker and/or the holes may be located at a fluid exit area of the screen.

Figure 2:
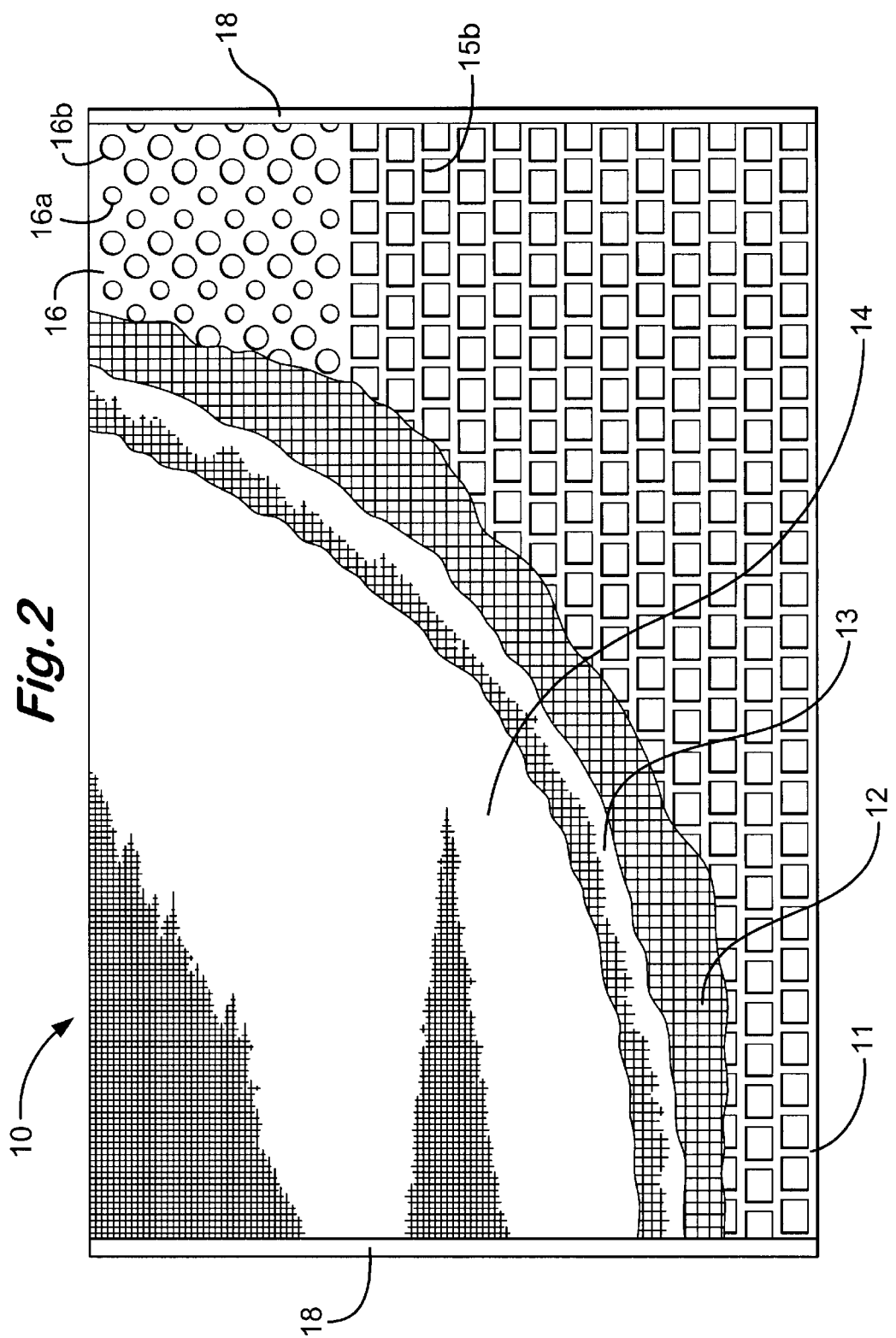

FIG. 2 shows another embodiment of the screen 10 of FIG. 1 and like numerals indicate like parts. The plate 11 in FIG. 2 has an area 16 with holes 16a and 16b therethrough. The holes 16a and 16b are of different opening areas as viewed from above and both holes 16a and 16b are smaller in opening size than are holes 15b. The holes 15b and 15a of FIG. 1, and holes 15b of FIG. 2, are generally square and the holes 16a and 16b of FIG. 2 are circular. It is within the scope of this invention to have holes in any plate or support according to the present invention of any desired opening shape as viewed from above, including, but not limited to, rectangular, triangular, elliptical, oval, pentagonal, and hexagonal.

Figure 3:
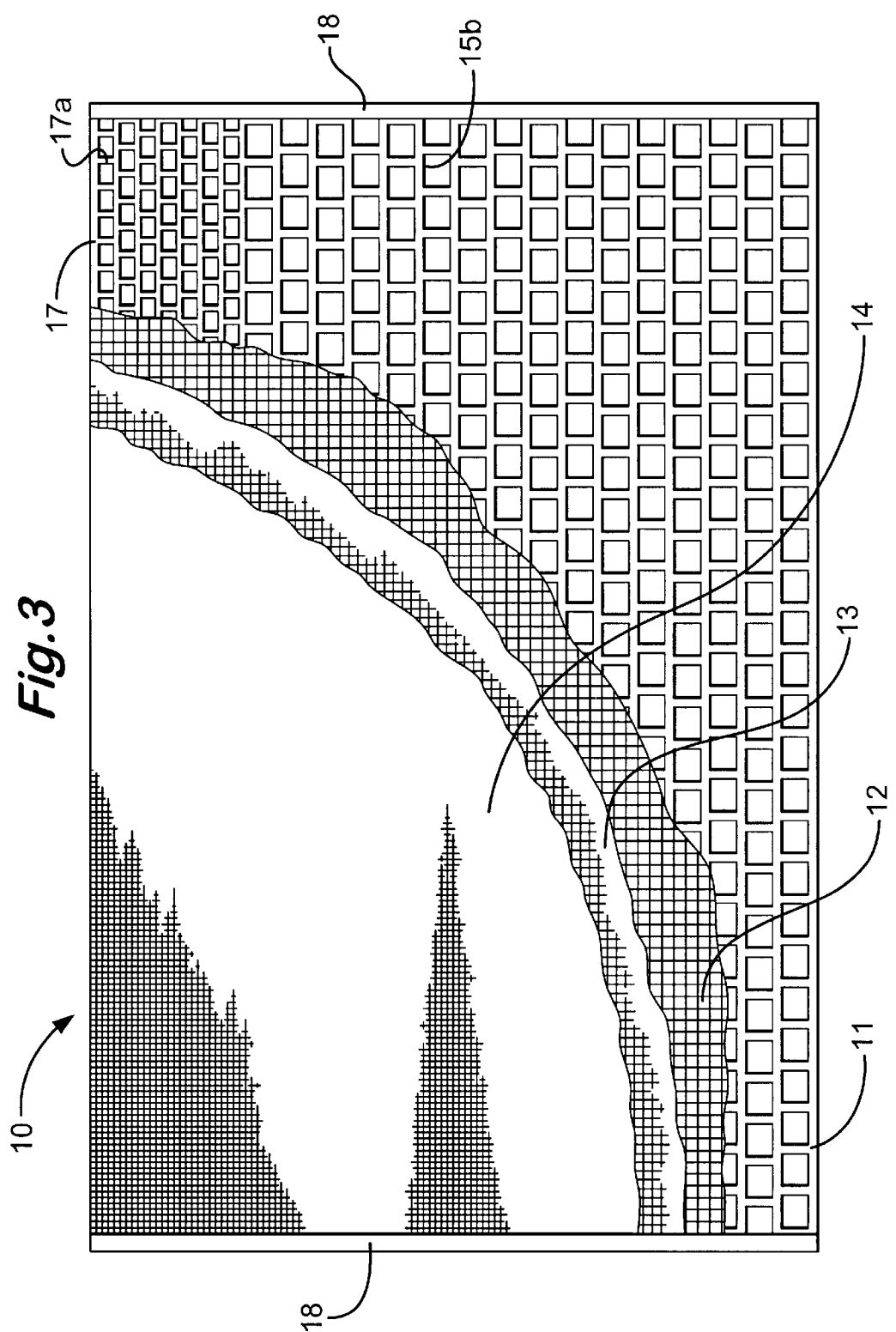

FIG. 3 shows another embodiment of the screen 10 of FIG. 1 and like numerals indicate like parts. The plate 11 in FIG. 3 has an area 17 with holes 17a therethrough. The holes 17a are smaller in opening size than are holes 15b.

Figure 4:
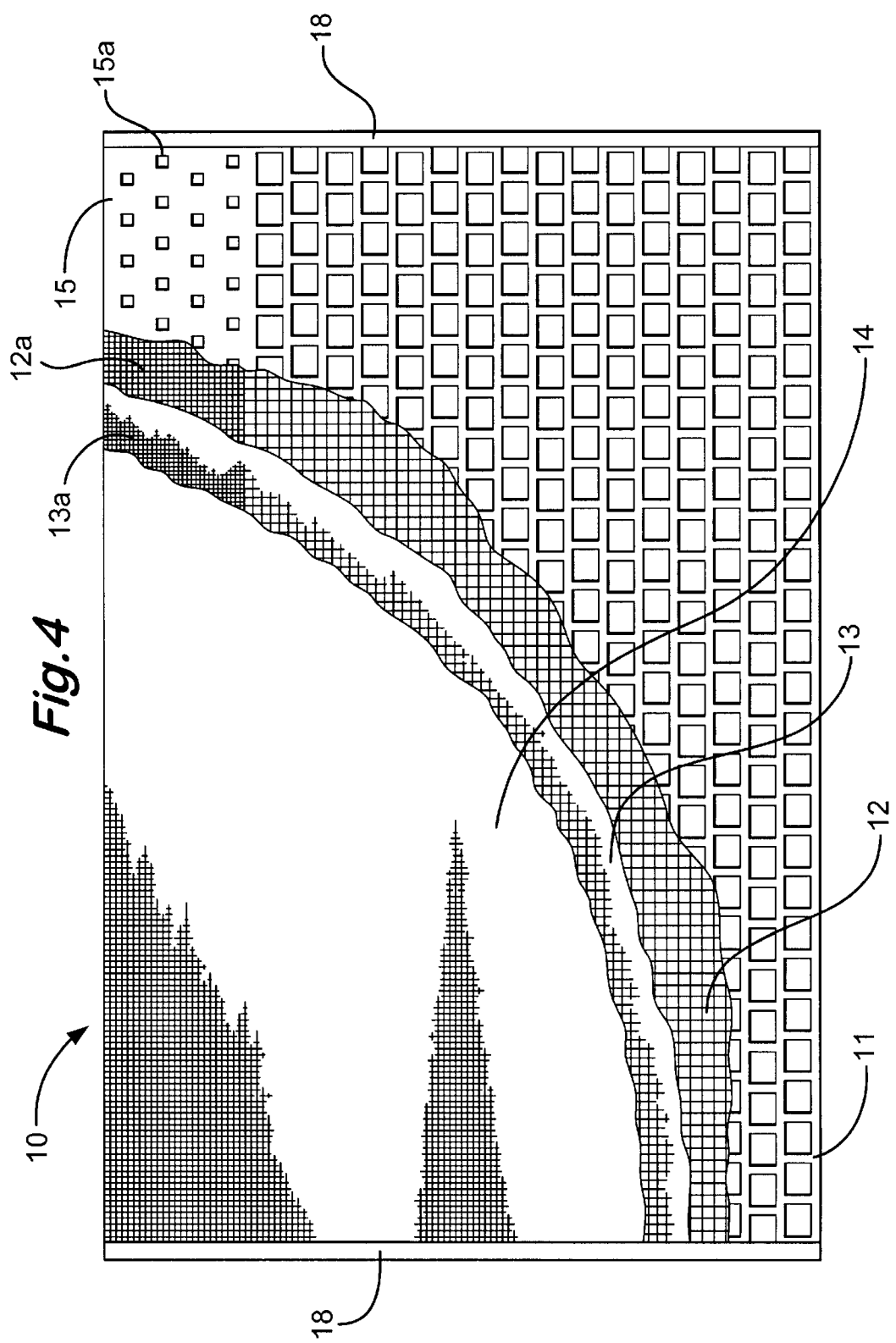

FIG. 4 shows another embodiment of the screen 10 of FIG. 1 and like numerals indicate like parts. The screening material layer 12 in FIG. 4 has an area 12a with screen mesh openings that are smaller than the screen mesh openings in the remainder of the screening material layer 12. The part of the screening material layer 12 with the openings 12a overlies the area 15 of the plate 11 which has the relatively smaller openings 15a. Similarly the screening material layer 13 in FIG. 4 has an area 13a with screen mesh openings that are smaller than the screen mesh openings in the remainder of the screening material layer 13. The part of the screening material layer 13 with the openings 13a overlies the area 15 of the plate 11 which has the relatively smaller openings 15a. It is to be understood that the areas 12a and 13a extend from one side of the screen to the other and overlie the entire area 15. It is within the scope of this invention to delete either the area 12a or 13a, or to add such an area to the layer 14. The areas 12a and 13a may be made by weaving the screening material in a single piece so that different areas have different size mesh openings or two separate pieces may be abutted and joined together. Alternatively, a separate piece of screening material may be added on top of part of the layer 12 or 13 to create the areas 12a and 13a. The effectively smaller openings in areas 12a and/or 13a may be achieved by simply using a tighter weave and/or by using thicker, heavier wire in either or both directions in the areas 12a and/or 13a.

It is within the scope of this invention for the screen 10 to have one, two, three or more layers of screening material, i.e., screen, mesh, and/or cloth made, e.g., of stainless steel wire and/or plastic. Any such layer or combination of layers may be bonded together (glued, welded, and/or sintered) in any known manner and/or bonded to the plate 11 in any known manner. Any such layer or layers of screening material may be substantially flat or may be undulating (with a series of alternating ridges and valleys) as is well known in the art.

Figure 5:
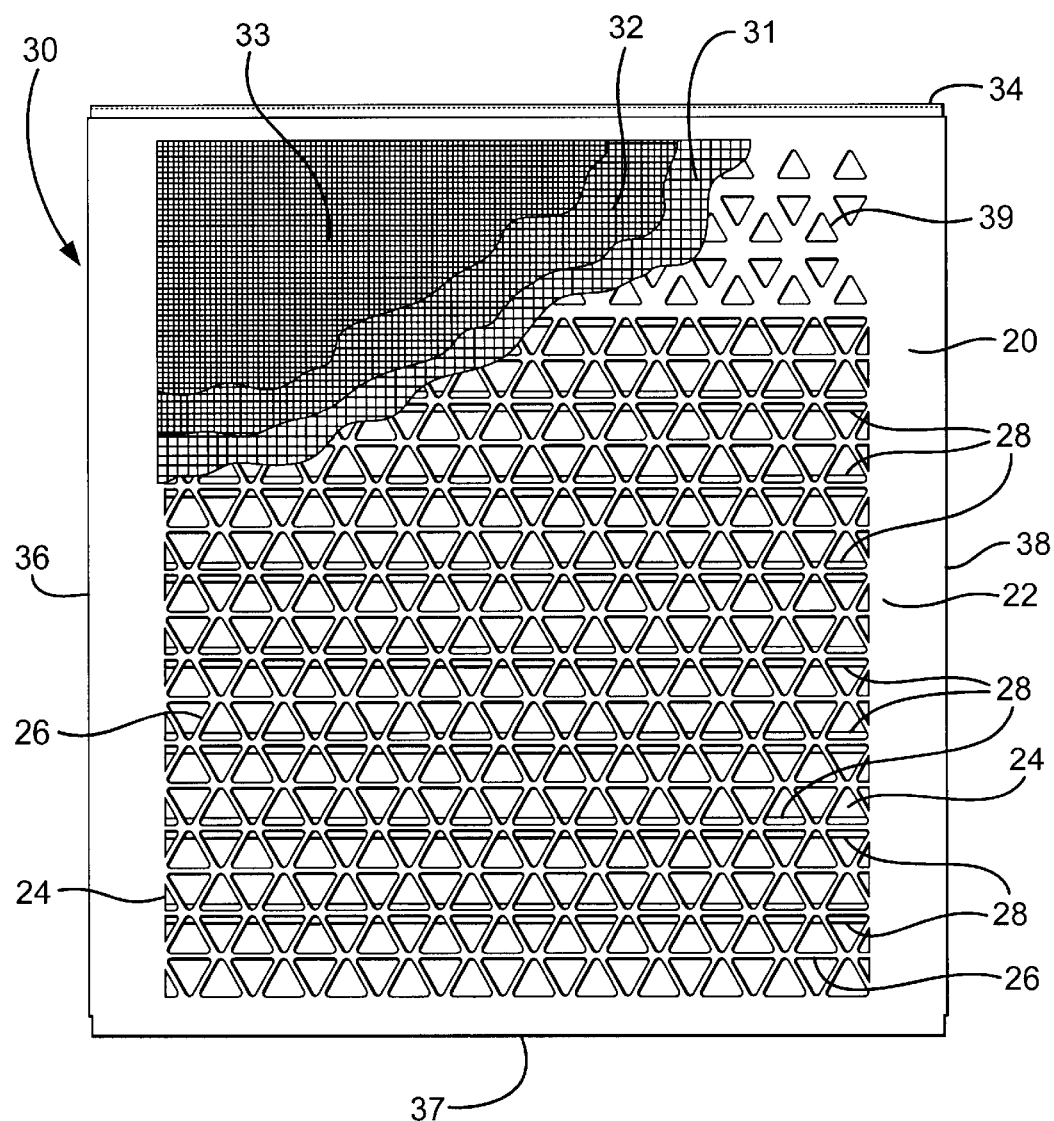

FIG. 5 shows a screen assembly 30 according to the present invention with a unibody structure 20 as described in U.S. Pat. No. 6,283,302 incorporated fully herein for all purposes. At and end of the screen assembly at which material and/or fluid to be treated is introduced to the screen assembly, openings 39 are provided that are smaller than other openings in the structure defined by members 26 and the space between the openings 39 is greater than that between the other openings. The screen assembly 30 has, optionally, three layers 31, 32, 33 of screening material bonded to a top surface 22 of the unibody structure 20. In certain aspects, the layers 31, 32, 33 are also sewn, bonded or glued together over substantially their entire surface area. Any unibody structure in U.S. Pat. No. 6,283,302 may incorporate teachings of the present invention for areas of excessive wear. Optionally, as is the case with any holes or series of holes or openings disclosed herein for a screen's fluid introduction area, openings 39 may be provided at a fluid exit part of the screen assembly 30.

A plurality of openings 24 through the unibody structure 20 define a plurality of support members 26. To the underside of the unibody structure 20 are, optionally, connected a plurality of spaced-apart ribs or strips 28 which, in one aspect are welded to a metal unibody structure 20. In this particular embodiment the ribs 28 are positioned along a substantial majority of their length directly beneath one of the support members 26 that extend across a major portion of the unibody structure 20; but it is within the scope of this invention to use no such ribs or to position them anywhere on the underside of the unibody structure 20. The unibody structure 20 has spaced-apart sides 36, 38.

The opening defined by the members 26 are larger as viewed from above than the openings 39 at one end of the screen assembly 30.

FIG. 6 shows a strip support 40 according to the present invention for a screen assembly. The strip support 40 is like a strip support 1500 described in U.S. Pat. No. 6,290,068 incorporated fully herein for all purposes; but the strip support 40 has more cross strips 42 between sides 41 at one of its ends that are closer together than strips of the support 1500 of the cited patent. The strip support 40 is positioned in a screen assembly using it so that fluid is initially introduced above the area that has the strips positioned closer together.

Figure 7:
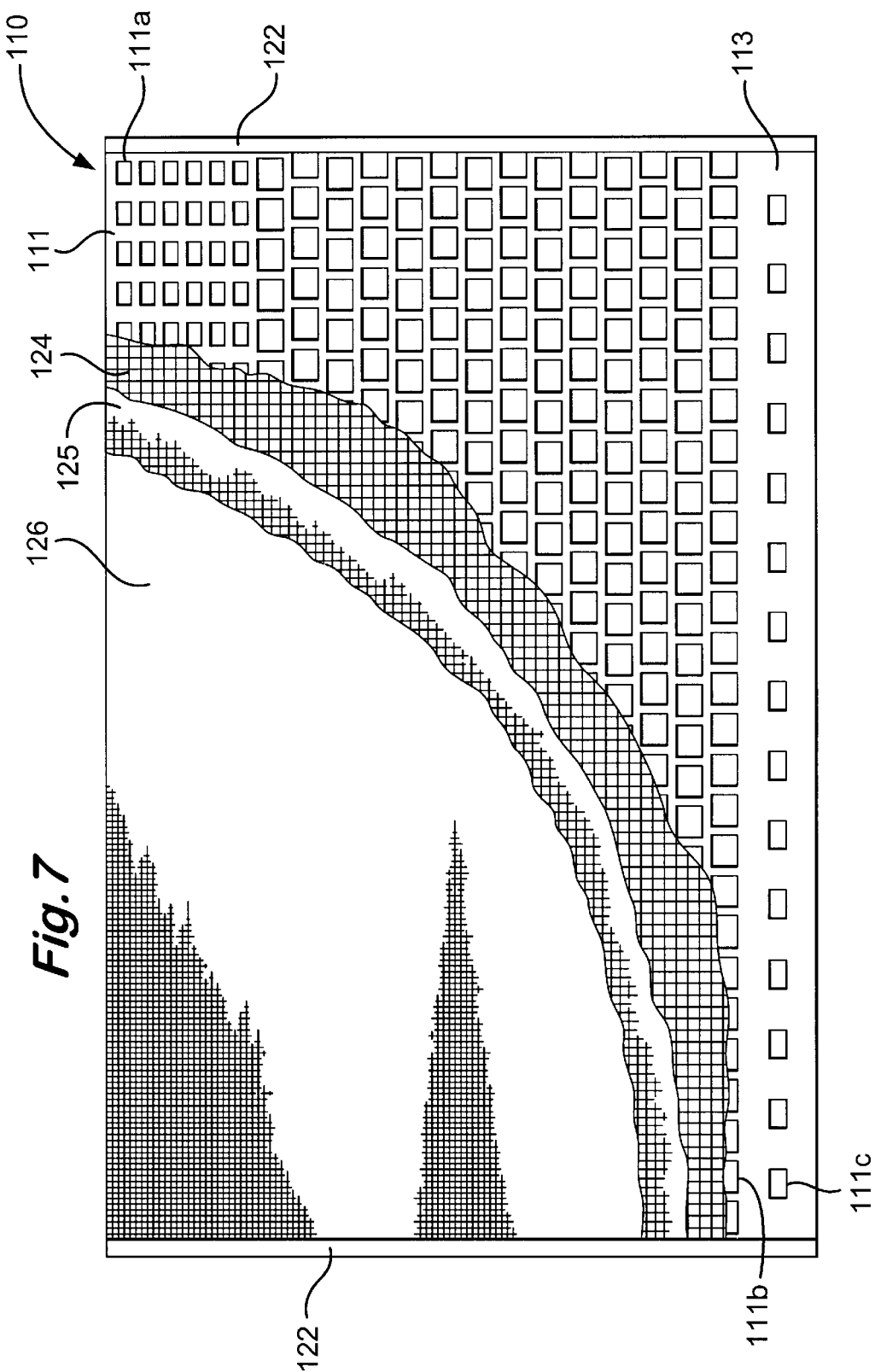

FIGS. 7 and 8 present perforated plates that are, in some respects, like those disclosed in U.S. Pat. Nos. 4,575,421; 5,417,859; 5,330,057; and 5,783,077—all of which are incorporated fully herein for all purposes; but a lower perforated plate 112 of a screen assembly 110 of FIG. 7 has an area 111 with openings 111a which are smaller than openings 111b in most of the remainder of the plate 111 and an area 113 with openings 111c that are smaller in opening size than the openings 111b; and the plate 112a in a screen assembly 110a in FIG. 8 has two areas, area 120 and area 121 with no openings therethrough. Hookstrips 122 are provided on opposite sides of the screen assemblies 110 and 110a, FIGS. 7 and 8, respectively; and each screen assembly has a plurality of layers 124–126 of screening material. Areas with no openings therethrough like the areas 120 and 121 may be provided in any plate or support according to the present invention at either a fluid or material introduction area and/or at a fluid or material exit area.

U.S. Pat. No. 6,290,068 discloses a variety of strip supports for screen assemblies with various spaced-apart strips. FIGS. 9 and 10 show strip supports according to the present invention and these teachings may be incorporated into any of the strip supports of U.S. Pat. No. 6,290,068 and/or into any of the plates in the patent. FIG. 9 shows a strip support 50 with sides 51 and sides 52. A plurality of strips 51a extend between the sides 52. Two strips 53 extend between the sides 51 and are located so that material introduced to screening material on top of the strip support 50 is introduced above the strips 53. One or more than two strips 53 may be used and they may be located as desired to provide wear members. The strips 53 may be of any desired thickness and width and may be spaced-apart as desired.

FIG. 10 shows a strip support 60 with sides 62 and opposed sides 61, 64. A plurality of spaced-apart strips 63 extend between the sides 64 and 61. The side 61 is enlarged as compared to the side 64 so that material introduced to screening material on top of the side 61 is introduced above the side 61. Alternatively the side 64, at which material exits a screen using the support 60, may be enlarged (or it may be enlarged in addition to the side 61).

According to the present invention, a tubular frame or tubular support for a screen assembly for a vibratory separator or shale shaker may also have, as compared to prior art frames and supports, additional structural members located so that material introduced to the separator or shaker is introduced at an area above the area of the frame or support that has the increased number of structural members. Such an area with an increased number of structural members will have openings defined by the structural members that are smaller in area, as viewed from above, than the openings in the remaining areas of the frame or support. FIG. 11 shows a tubular frame 70 which is, in some respects, like frames disclosed in U.S. Pat. No. 5,944,993 (incorporated fully herein for all purposes); but the frame 70 has openings 70a–70f in a first area thereof (like, e.g., the openings throughout a frame in U.S. Pat. No. 5,934,993 in size) which are larger than openings 70g–70l in a second area of the frame 70. Tubular members 71–74 define the various openings in the frame 70. An area of relatively smaller openings may be provided, according to the present invention, in any desired area of a frame.

Figure 12:
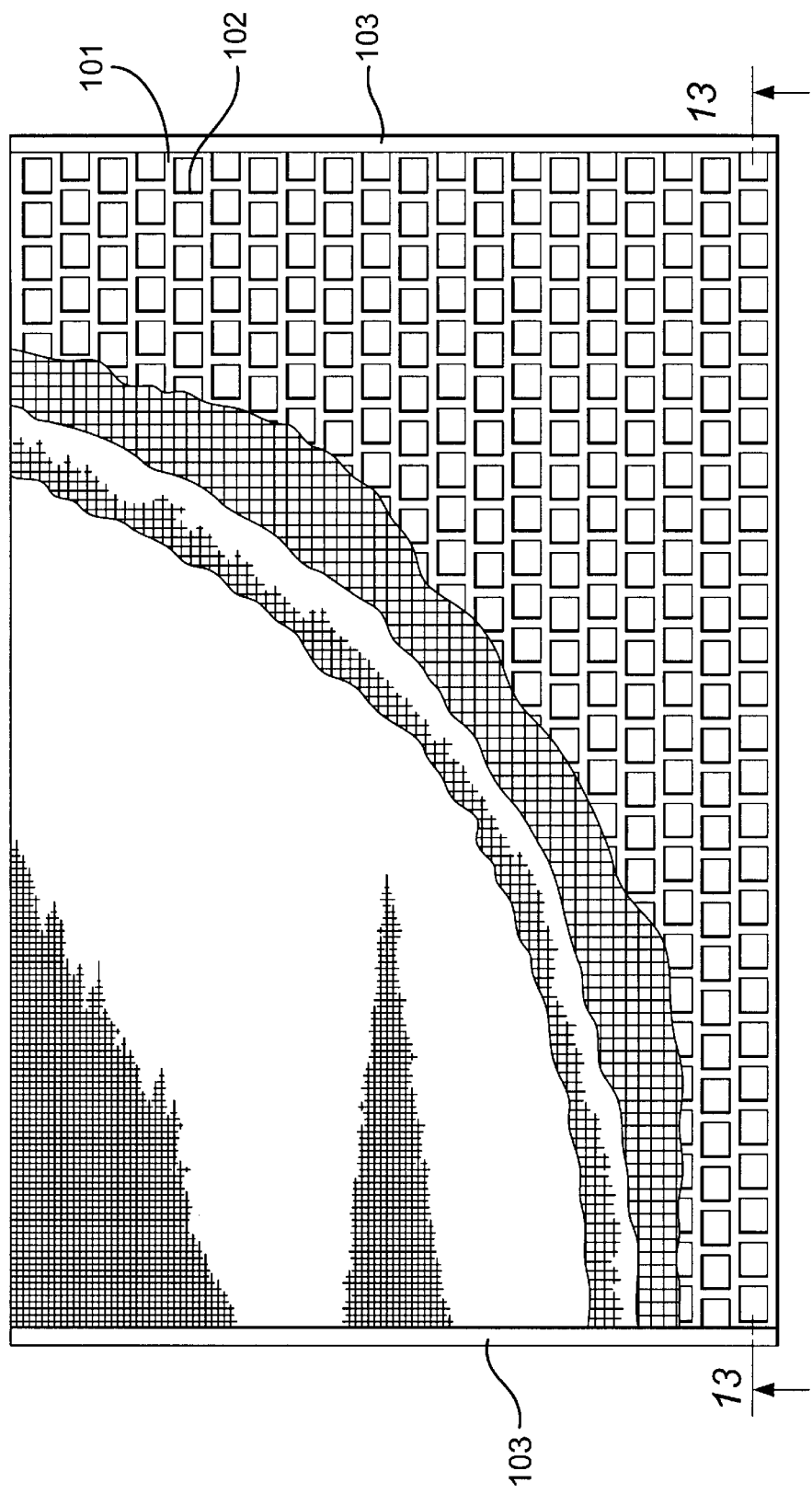
FIG. 12 is a top view of a prior art screen.

FIGS. 12 and 13 show a prior art screen assembly 100 with a perforated plate 101 which has a series of openings 102 across the plate as disclosed, e.g., in U.S. Pat. No. 5,330,057. Hookstrips 103 are provided on opposed sides of the plate 101. The plate 101 is of a substantially uniform thickness across its entire extent. FIG. 14 shows a perforated plate 140 according to the present invention which has a plate body 141 with a series of perforations 141a therethrough. The plate body 141 has a portion 142 which is thicker than the remainder of the plate body. One or more layers of screening material may be used on either side of the plate body 141 and a screen assembly with the plate body 141 may be positioned with the portion 142 projecting up or projecting down in use on a vibratory separator or shaker. In certain aspects the plate 140 is positioned in use so that material introduced onto a screen assembly using the plate 140 is introduced at an area above the portion 142 so that the plate at this portion, and thus the screen assembly, last longer. Any strip, strip support, frame, or frame member may, according to the present invention, employ these teachings of increased thickness to combat excessive wear.

FIG. 15 shows a perforated plate 150 according to the present invention which has a plate body 151 with a series of perforations 151a therethrough. The plate body 151 has a step portion 152 which is thicker than the remainder of the plate body. One or more layers of screening material may be used on either side of the plate body 151 and a screen assembly with the plate body 151 may be positioned with the portion 152 projecting up or projecting down in use on a vibratory separator or shaker. In certain aspects the plate 150 is positioned in use so that material introduced onto a screen assembly using the plate 150 is introduced at an area above the portion 152 so that the plate at this portion, and thus the screen assembly, last longer.

FIG. 16 shows a perforated plate 160 according to the present invention which has a plate body 161 with a series of perforations 161a therethrough. The plate body 161 has an end portion 162 which is thicker than the remainder of the plate body and the plate body gradually decreases in thickness from one end to the other. One or more layers of screening material may be used on either side of the plate body 161 and a screen assembly with the plate body 161 may be positioned with the portion 162 projecting up or projecting down in use on a vibratory separator or shaker. In certain aspects the plate 160 is positioned in use so that material introduced onto a screen assembly using the plate 160 is introduced at an area above the portion 162 so that the plate at this portion, and thus the screen assembly, last longer.

Figure 17:
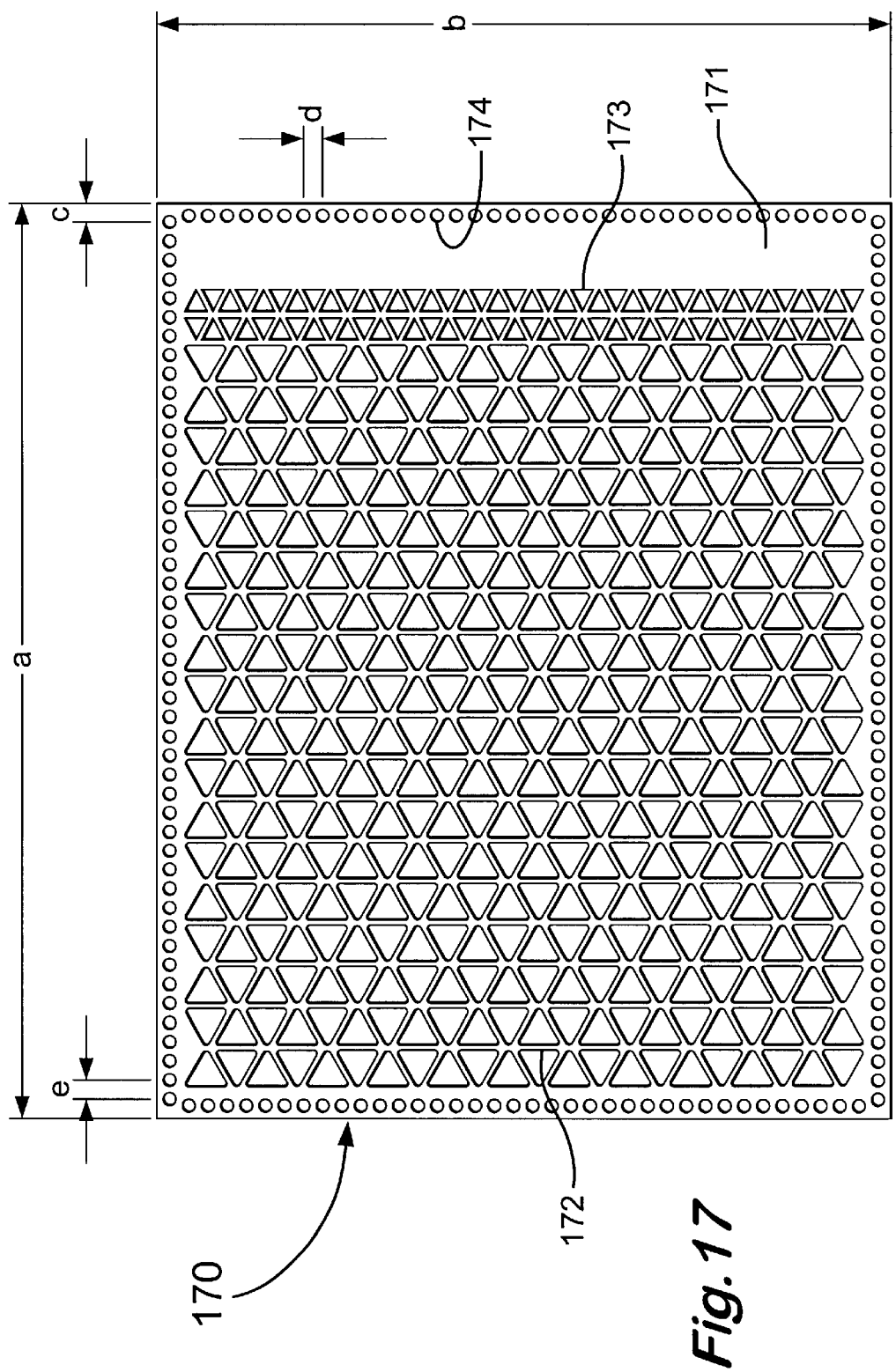
FIG. 17 is a top view of a screen support according to the present invention.

FIG. 17 shows a perforated plate 170 which has a series of openings 172 across most of its surface and s series of holes 174 around its periphery to assist in bonding around the edges of the plate 170. Holes 173 at one end of the plate 170 are smaller than the holes 172. Also between the holes 173 and the end (the end to the right in FIG. 17) of the plate 170 there is an optional area with no holes, etc. This area may also have holes 173. Material to be treated by a screen assembly using the plate 170 is, preferably, introduced above the area with the holes 173. In one particular embodiment the plate 170 is made from 12 gauge mild steel about 0.12 inches thick and the various measurements a–e are as follows in inches: a-35.938; b-25.563; c-0.719; d-0.740; e-0.750. As noted above, although he holes in the plate 170 are shown as generally triangular, they may be any desired shape.

Figure 18:
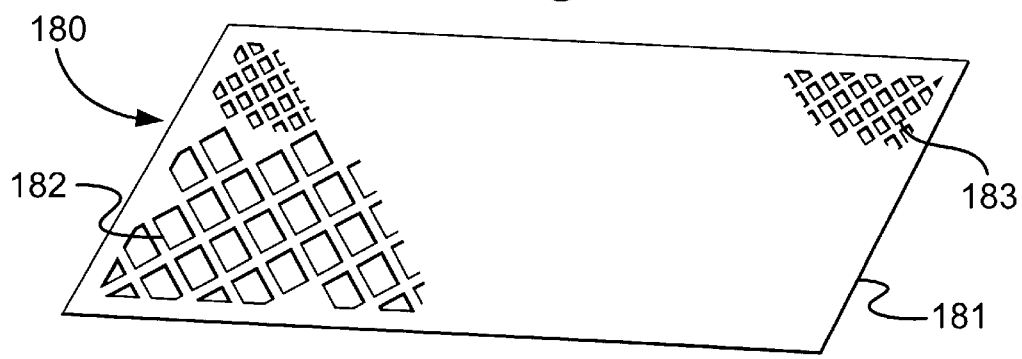

Certain prior art screen assemblies employ a plastic grid to connect together layers of screening material. For example, U.S. Pat. No. 5,783,077 shows plastic grids in which openings are all of substantially the same size or in which all but two of the openings are of substantially the same size. FIGS. 18 and 19 show plastic grids according to the present invention in which there are one or more areas with a series of openings that are smaller than openings in another series of openings in the same grid. Such grids according to the present invention may have openings that correspond in size to openings of different size in a perforated plate or other support which is used with the combined screening material layers connected by the plastic grid. It is within the scope of the present invention to employ series of openings of different size in any part of a plastic grid.

FIG. 18 shows a plastic grid 180 according to the present invention which has a first series of openings 182 through a body 181 and a second series of openings 183 through the body 181. It is to be understood that both series of openings extend across the surface of the grid from one side to the other although this is only shown partially in FIG. 18 and/or that discrete areas of different openings and/or different opening spacing are provided on the grid. Also it is within the scope of the present invention to provide a series of smaller openings in only a portion of the grid. The openings 183 are smaller as viewed a from above than the openings 182. It is within the scope of this invention to provide a plastic grid with holes or openings corresponding to those of any screen support disclosed herein. Alternatively, a hot melt glue pattern is used instead of such any such grid.

Figure 19A:
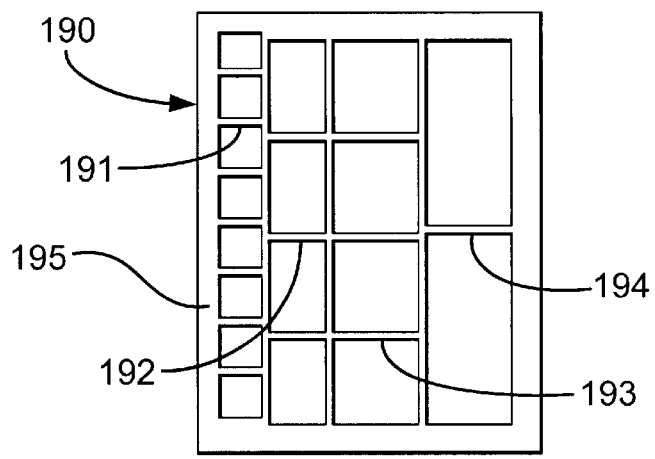
FIGS. 19A and 19B are top views of plastic grids according to the present invention.
Figure 19B:
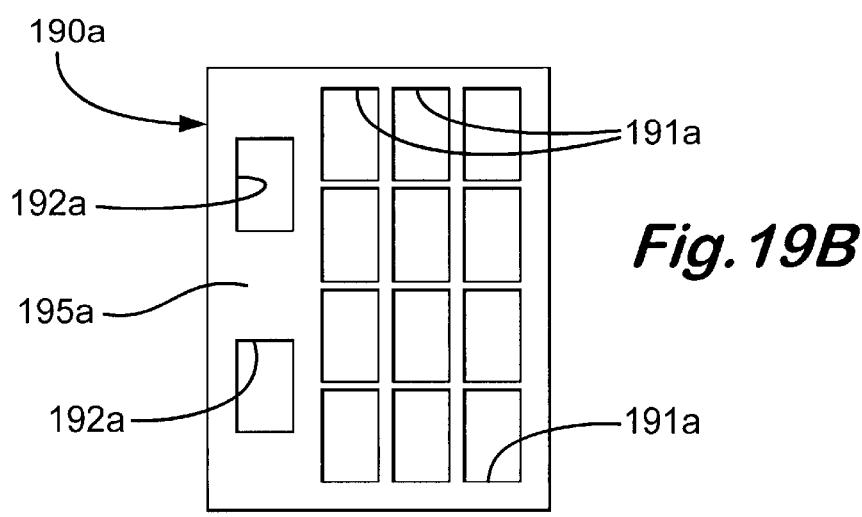
Figure 20:
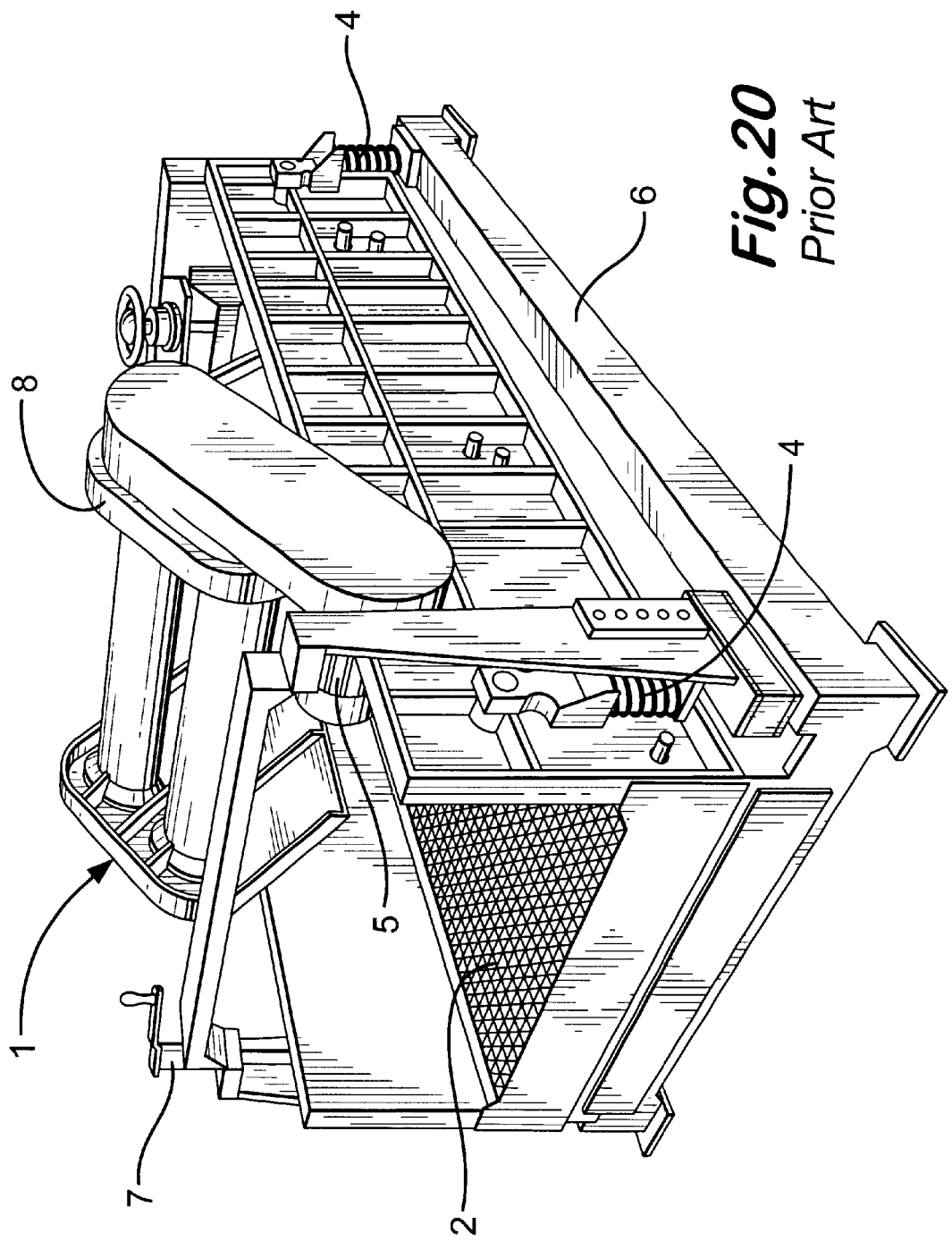
FIG. 20 is a perspective view of a prior art shale shaker.
Figure 21:
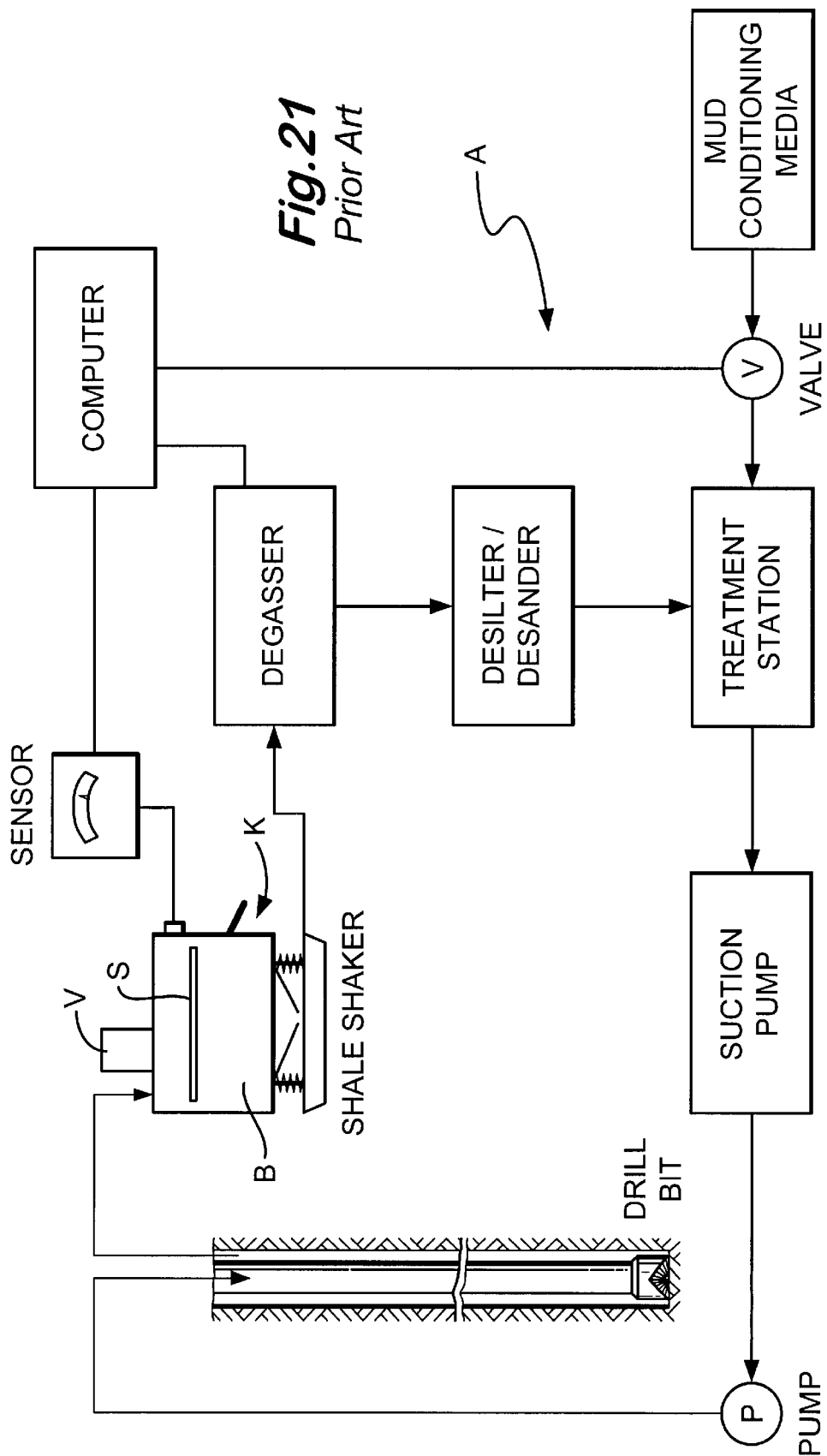
FIG. 21 is a schematic view of a prior art shaker system.

FIG. 19A shows a plastic grid 190 according to the present invention which has a first series of openings 191 through a body 195, a second series of openings 192, a third series of openings 193, and a fourth series of openings 194. The openings get gradually bigger as viewed from above going from left to right in FIG. 19. Any series or any two series of openings may be deleted and any remaining series of openings may then be extended on the body 195, according to the present invention. It is within the scope of this invention to provide openings in a plastic grid that correspond to the openings in a screen support according to the present invention which is to be used with a screen layer combination that includes the plastic grid. FIG. 19B shows a plastic grid 190a (like the grid 190, FIG. 19A in some respects) according to the present invention which has a first series of openings 191a through a body 195a and a second series of openings 192a. The openings 191a, 192a may, as shown, be of substantially the same size, but with fewer openings per unit of surface area where the openings 192a are located (e.g. for a fluid introduction area or a fluid exit area) than the number of openings 191a at other areas of the grid.

FIG. 24 shows a shale shaker 210 with upper screens 201 and 202 and a lower screen 203. Such a shale shaker and upper screens are described in U.S. Pat. No. 5,641,070 incorporated fully herein for all purposes. The lower screen 203 according to the present invention has a support which has an area 203a with smaller openings or holes than openings or holes in the remainder of the support, since material flows from the upper screen 202 onto the lower screen 203 at an area above the location of the area 203a.

FIG. 25 shows a perforated plate 220 which may, in certain embodiments, be like the plate of FIG. 17, but which has a middle portion with openings 224 therethrough that are smaller in opening size than openings 222 that extend across most of the remainder of the plate 220. Holes 211 are around the edge of the plate 220. A plate like the plate 220 may be used for the support for the lower screen 203 in FIG. 24. One, two or more areas with holes 224, i.e., with holes that are smaller than other holes on the plate, may, according to the present invention, be used for any plate or unibody structure.

FIG. 26 shows a screen assembly 230 for a vibratory separator or shale shaker, according to the present invention, with a support 231 with a plurality of openings therethrough which may be any perforated plate disclosed herein according to the present invention for supporting screening material layers 232–234 on the support 231. The support 231 has a plurality of spaced-apart openings 235 or holes extending through the plate from one surface to the other and may include various openings as disclosed for any plate herein according to the present invention. Any one or two layers of screening material may be deleted and the layers may be connected, sintered, sewn, bonded or glued together in any known way (as may be any layers of any screen assembly disclosed herein and any such layers may be used with any screen assembly disclosed herein). Any support according to the present invention may be substituted for a plate used as the support 231.

It is within the scope of this invention to provide a screen support which has a stronger fluid introduction area by placing and/or connecting a secondary support piece with respect to a primary support (e.g. any support known in the prior art and any support disclosed herein). The secondary piece may be of the same thickness as the primary support or thinner or thicker. The secondary piece may be made of the same material (e.g., but not limited to, metal, epoxy, plastic, fiberglass) as the primary support, or the secondary piece may be made of glue or of a material different from that of the primary support. If the secondary piece is connected to the primary support, such connection may be accomplished by any known method (including, but not limited to, bonding, fusing, welding, sintering, and gluing) and/or with any known connector(s) and/or connection apparatus (e.g., but not limited to screws, bolts, brads, staples, adhesive, releasably cooperating hook-and-loop materials, and nails).

Figure 27A:
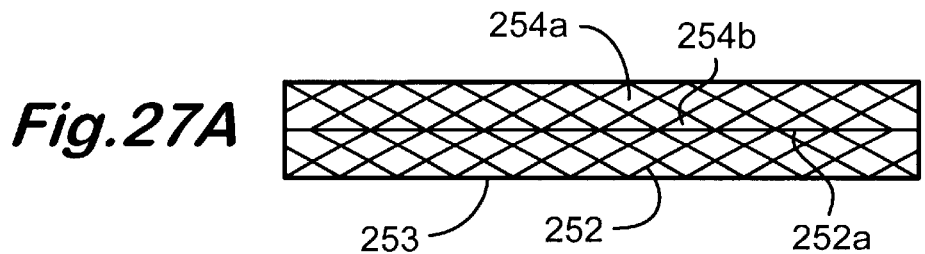
FIG. 27A is a top view of part of a screen support according to the present invention.
Figure 27B:
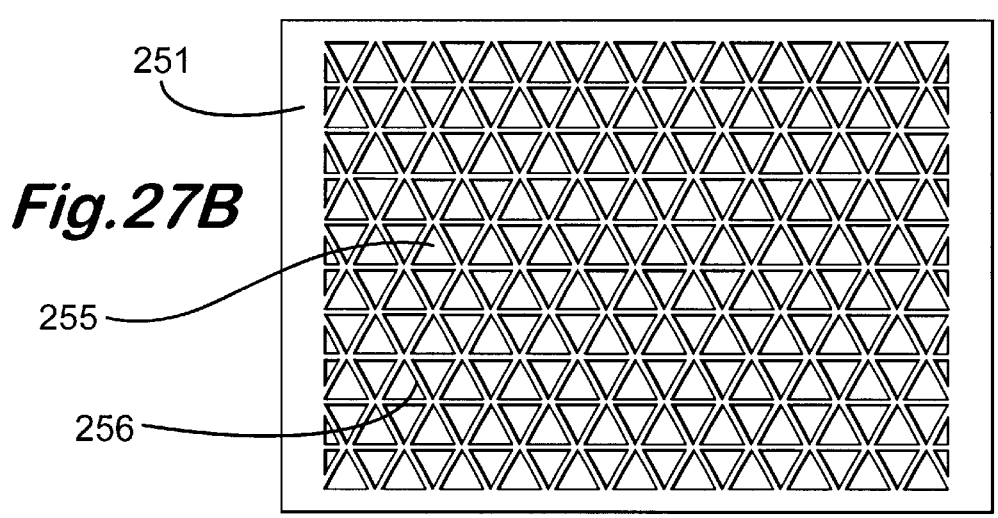
FIG. 27B is a top view of part of a screen support according to the present invention.
Figure 27C:
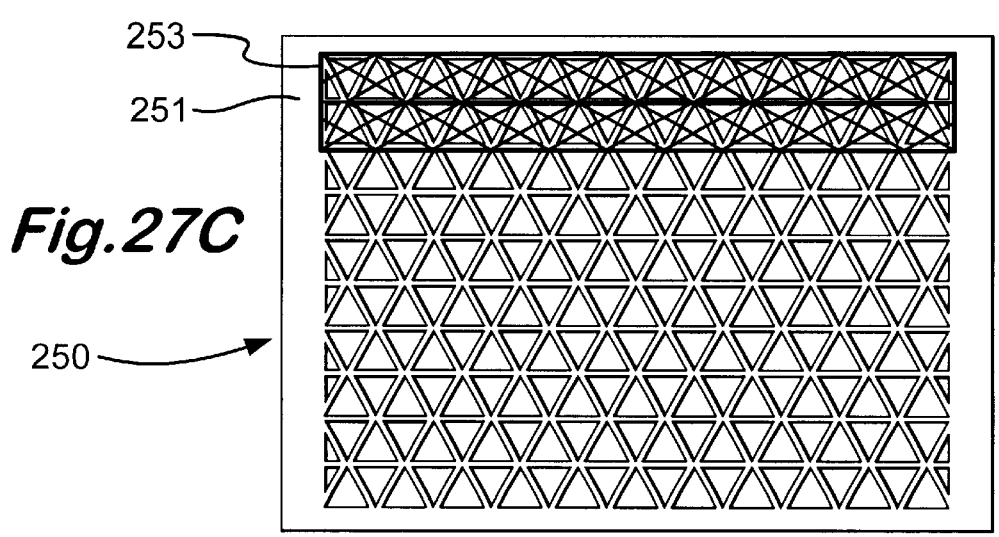
FIG. 27C is a top view of the screen support parts of FIGS. 27A and 27B combined.

As shown in FIGS. 27A–27C, a secondary piece 253 (or two or more of them) is placed over a primary support 251 to form a support 250 according to the present invention. Some of the structural parts 252 and 252a of the secondary piece 253 which define openings 254a and 254b through the secondary piece 253 also block parts of openings 255 (defined by members 256) through the primary support 251. One or more secondary pieces (e.g. like the secondary piece 253) may be used at any desired location on a primary support (including any support plate, unibody structure, frame and/or strip support in the prior art and/or referred to herein). Any secondary piece according to the present invention (which, in certain aspects is a plastic grid, a piece of coarse mesh or a piece of mild steel) may be applied to a primary support of a screen assembly (between any two layers or on the top of a topmost layer of mesh or screening material of a screen assembly) at any time during or following production of the screen assembly and before or after any step in any known method for making a screen assembly. The primary support 251 may be a perforated plate, it may have a frame around and/or with one or more crossmembers under it, and/or it may be a unibody support structure. The secondary piece may be a piece of a perforated plate, a piece of sheet material, or a piece of coarse screening material. The openings of the primary support and of the secondary piece may be of any desired shape, size and configuration and, in one aspect, the openings of both pieces are the same and in another aspect the openings are of different size as viewed from above.

Figure 28A:
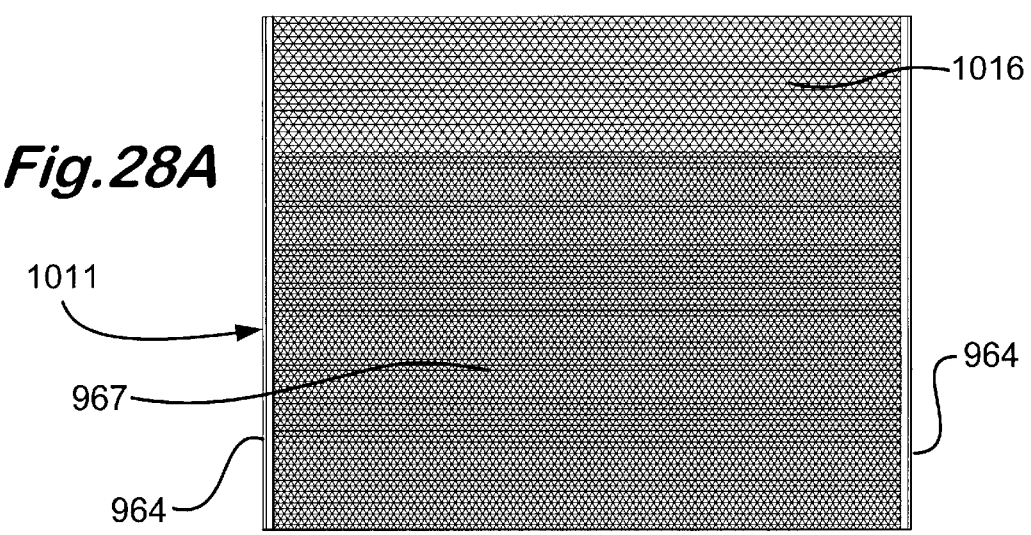
FIGS. 28A, 28B and 28C are top views of screen assemblies according to the present invention.
Figure 28B:
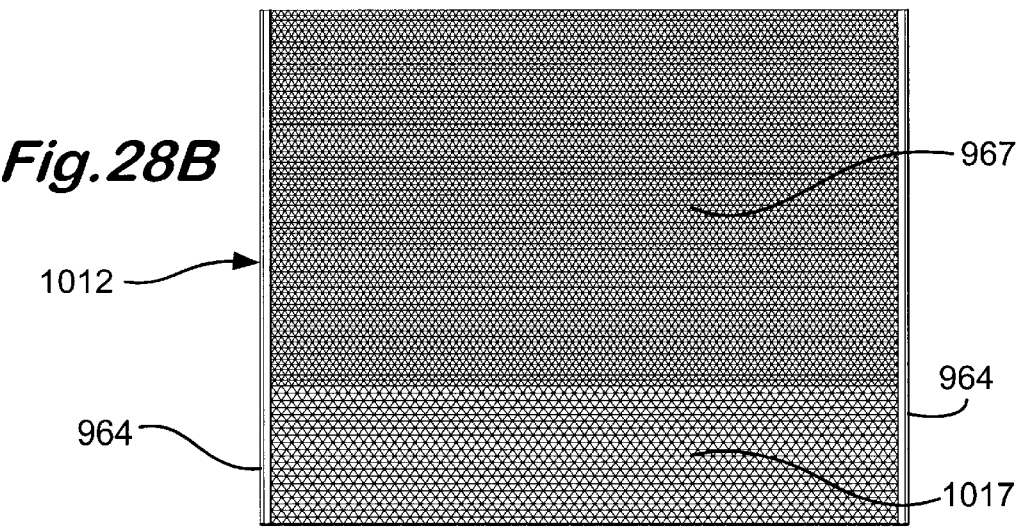
Figure 28C:
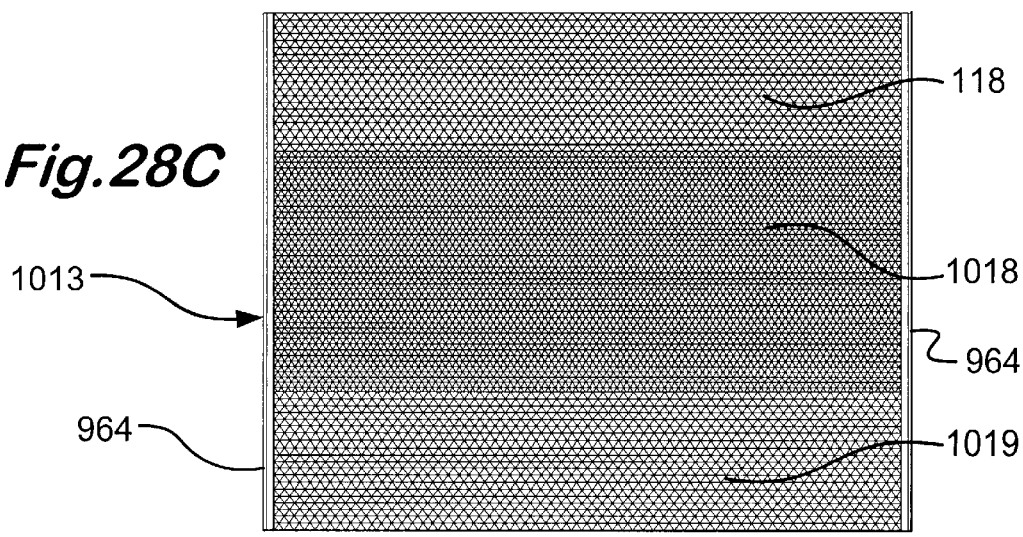

FIGS. 28A, 28B and 28C show screen assemblies according to the present invention in which only a portion of an uppermost screen has a top coarse screen portion located above it. In FIG. 28A a coarse top screen portion 1016 of coarse screening material is positioned at the back end (e.g., a material entry end) of a screen assembly 1011 at which location fluid to be processed is introduced onto the screen assembly. In FIG. 28B a coarse top screen portion 1017 of coarse screening material is positioned at a front end (e.g., a material exit end) of a screen assembly 1012 at which location material exits from the screen assembly. In FIG. 28C a screen assembly 1013 has both screen portions 1018 (like the screen portion 1016, FIG. 28A) and 1019 (like the screen portion 1017, FIG. 28B). Optionally any of the screen assemblies in FIGS. 28A–28C may have side hookstrips 964 (e.g., but not limited to, any as known in the prior art or as described in U.S. Pat. No. 6,325,216). Alternatively any of the screen assemblies of FIGS. 28A–28C may have a lower support that is a frame, a perforated plate, or a strip support. Any of the screen assemblies of FIGS. 28A–28C may have any known layer or layers of screening material or mesh.

The present invention, therefore, provides in certain, but not necessarily all embodiments, a support for a screen assembly for a vibratory separator, the support having a body, a first series of holes through the body, each of the first series of holes having a first opening size as viewed from above, a second series of holes through the body, each of the second series of holes having a second opening size as viewed from above, the second series of holes at a material introduction area of the body and the support positionable in a vibratory separator so that the material introduction area is adjacent a location of material introduction to the vibratory separator (and/or such a support with a material exit area and such a separator with a corresponding material exit area), and the second opening size smaller than the first opening size and/or the second holes different in shape as compared to a shape, as viewed from above, of the first holes, and/or the second holes spaced-apart differently than a spacing apart of the first holes. Such a support may include one or some of the following, in any possible combination: the second series of holes includes primary holes and secondary holes, each of the primary holes having a primary opening size as viewed from above and each of the secondary holes having a secondary opening size as viewed from above, and the primary opening size larger than the secondary opening size; wherein holes of the first series of holes are spaced-apart a first distance and holes of the second series of holes are spaced-apart a second distance, the first distance greater than the second distance; wherein holes of the first series of holes and holes of the second series of holes have a similar outline shape as viewed from above; wherein holes of the first series of holes and holes of the second series of holes have a different outline shape as viewed from above; wherein an outline shape of the holes of the first series of holes and of the holes of the second series of holes is from the group consisting of square, rectangular, circular and triangular; wherein the body is a plate; wherein the body has a series of spaced-apart support strips and holes of each series of holes are between and defined by portions of support strips; wherein the body is a frame with a plurality of frame members with at least one frame member, and in one aspect a plurality of frame members, intersecting other spaced-apart frame members to define the holes of the second series of holes; wherein the material introduction area is at an end of the screen support; wherein the material introduction area is at an intermediate part of the screen support; a secondary support piece superimposed on the body, the secondary support piece having a plurality of spaced-apart support piece holes defined by structural parts of the secondary support piece so that the superimposition of the secondary support piece on the body results in the definition of the holes of the second series of holes; wherein the secondary support piece is made from material like or unlike; wherein the secondary support piece is connected to the body; and/or hookstrip mounting apparatus on two opposed spaced-apart sides of the support. Also according to the present invention, there is provided a screen assembly with any such support, a vibratory separator or shale shaker with any such support, and methods of using such a screen assembly. Such a screen assembly may have one or some, in any possible combination, of the following: wherein the screening material is connected to the support by a method from the group consisting of fusing, welding, sintering, bonding, gluing, and sewing; wherein the support is from the group consisting of plate, frame, unibody structure, and strip support; wherein the support further comprises hookstrip mounting apparatus on two opposed spaced-apart sides of the support; wherein the screening material includes a plurality of superimposed layers of screening material; wherein at least two layers of the layers of screening material or all the layers are connected together; and/or wherein the at least two layers of the layers of screening material or all layers are connected together by a method from the group consisting of fusing, sintering, welding, bonding, gluing, and sewing.

The present invention, therefore, provides in certain, but not necessarily all embodiments, a support for a screen assembly for a vibratory separator, the support having a body, a first series of holes through the body, the body having a solid imperforate material introduction area and the support positionable in a vibratory separator so that the material introduction area is adjacent a location of material introduction to the vibratory separator. Such a support may also have a solid material exit area for positioning adjacent a material exit area of a vibratory separator.

The present invention, therefore, provides in certain, but not necessarily all embodiments, a support for a screen assembly for a vibratory separator, the support having a body, a first series of holes through a first area of the body, a second series of holes through the body, the second series of holes at a material introduction area of the body and the support positionable in a vibratory separator so that the material introduction area is adjacent a location of material introduction to the vibratory separator, and the body thicker at the material introduction area than at the first area; and/or the body thicker at a material exit area thereof. Such a support may have such a thickness wherein the thickness of the body tapers from the material introduction area to the first area.

The present invention, therefore, provides in certain, but not necessarily all embodiments, a plastic grid (or a pattern of glue) for fusing (or gluing) together layers of screening material of a screen assembly of a vibratory separator, the plastic grid (or glue pattern) having a body, a first series of holes through the body, each of the first series of holes having a first opening size as viewed from above, a second series of holes through the body, each of the second series of holes having a second opening size as viewed from above, the second series of holes at a selected area of the body and the grid (or pattern) within a screen assembly positionable in a vibratory separator so that the selected area is adjacent a selected location with respect to the vibratory separator, and the second opening size smaller than the first opening size and/or the body with fewer second holes per unit area in the second area than first holes per unit area in the first are and/or wherein the second area is from the group consisting of a material introduction area and a material exit area.

The present invention, therefore, provides in certain, but not necessarily all embodiments, a support for a screen assembly for use in a vibratory separator, the support having a main body with a plurality of main body openings therethrough, the main body having a main body surface area, a secondary body in contact with the main body and covering a portion thereof (either on top of or beneath the main body), the secondary body with a plurality of secondary body openings therethrough, the secondary body with a secondary body surface area, the secondary body surface area smaller than the main body surface area and, in certain aspects, such a support wherein parts of the secondary body block parts of main body openings.

What is claimed is:

1. A support for a screen assembly for a vibratory separator, the support comprising
    a body with two pairs of opposed sides including a first pair with a first side parallel to a second side and a second pair with a third side parallel to a fourth side,
    a first series of first holes through the body, each of the first series of first holes having a first opening size as viewed from above,
    a second series of second holes through the body, each of the second series of second holes having a second opening size as viewed from above,
    the second series of second holes at a material introduction area of the body and the support positionable in a vibratory separator so that the material introduction area is adjacent a location of material introduction to the vibratory separator,
    the second opening size smaller than the first opening size,
    the first series of first holes comprising a plurality of first lines of first holes, the first lines parallel to each other, the first holes of each of the first lines spaced-apart from each other a first distance,
    the second series of second holes comprising a plurality of second lines of second hoes, the second lines parallel to each other, the second holes of each of the second lines spaced-apart from each other a second distance, and with no first holes interspersed among the second holes, and with no second holes interspersed among the first holes,
    the plurality of first lines numbering more than the plurality of second lines, and
    the first lines and the second lines extending across the body from the first side to the second side, the first and the second lines positioned so that material introduced onto the material introduction area of the body can initially encounter the second holes of the second lines.

2. The support of claim 1 wherein
    a third series of third holes interspersed between the second holes,
    each of the third holes having a third opening size as viewed from above, and
    the third opening size smaller than the second opening size.

3. The support of claim 1 wherein the first distance is less than the second distance.

4. The support of claim 1 wherein holes of the first series of holes and holes of the second series of holes have the same outline shape as viewed from above.

5. The support of claim 1 wherein holes of the first series of holes and holes of the second series of holes do not have the same outline shape as viewed from above.

6. The support of claim 1 wherein an outline shape of the holes of the first series of holes and an outline shape of the holes of the second series of holes are from the group consisting of square, rectangular, circular and triangular.

7. The support of claim 1 wherein the body is a plate.

8. The support of claim 1 wherein the body has a series of spaced-apart support strips and holes of each series of holes are between support strips.

9. The support of claim 1 wherein the body is a frame with a frame members with at least one frame member intersecting other spaced-apart frame members to define the holes the second series of holes.

10. The support of claim 1 wherein the material introduction area is at an end of the screen support.

11. The support of claim 1 wherein the material introduction area is at an intermediate part of the screen support.

12. The support of claim 1 further comprising
    a secondary support pie superimposed on the body.

13. The support of claim 12 wherein the secondary support piece is made from material like material from which the body is made.

14. The support of claim 12 wherein the secondary support piece is made from material different from material from which the body is made.

15. The support of claim 12 wherein the secondary support piece is connected to the body.

16. The support of claim 1 further comprising
    hookstrip mounting apparatus on two opposed spaced-apart sides of the support.

17. A screen assembly for a vibratory separator, the screen assembly comprising
    a support, the support comprising a body,
    the body with two pairs of opposed sides including a first pair with a first side parallel to a second side and a second pair with a third side parallel to a fourth side, a first series of first holes through the body, each of the first series of first holes having a first opening size as viewed from above, a second series of second holes through the body, each of the second series of second holes having a second opening size as viewed from above, the second series of second holes at a material introduction area of the body and the support positionable in a vibratory separator so that the material introduction area is adjacent a location of material introduction to the vibratory separator, the second opening size smaller than the first opening size, the first series of first holes comprising a plurality of first lines of first holes, the first lines parallel to each other, the first holes of each of the first lines spaced-apart from each other a first distance, and with no second holes interspersed among the first holes, and with no first holes interspersed among the second holes, the second series of second holes comprising a plurality of second lines of second holes, the second lines parallel to each other, the second holes of each of the second lines spaced apart from each other a second distance, the plurality of first lines numbering more than the plurality of second lines, the first lines and the second lines extending across the body from the first side to the second side, the first lines and the second lines positioned so that material introduced onto the material introduction area of the body initially encounters the second holes of the second lines, and
    screening material on the support.

18. The screen assembly of claim 17 wherein the screening material is connected to the support by a method from the group consisting of fusing, welding, bonding, gluing, end sewing.

19. The screen assembly of claim 17 wherein the support is from the group consisting of plate, frame, unibody structure, and strip support.

20. The screen assembly of claim 17 wherein the support further comprises hookstrip mounting apparatus on two opposed spaced-apart sides of the support.

21. The screen assembly of claim 17 wherein the screening material includes a plurality of superimposed layers of screening material.

22. The screen assembly of claim 21 wherein at least two layers of the superimposed layers of screening material are connected together.

23. The screen assembly of claim 21 wherein the at least two layers of the superimposed layers of screening material are connected together by a method from the group consisting of fusing, sintering, welding, bonding, gluing, and sewing.

24. A support for a screen assembly for a vibratory separator, the support comprising
a body,
a first series of holes through the body, each of the first series of holes having a first opening size as viewed from above,
a second series of holes through the body, each of the second series of holes having a second opening size as viewed from above,
the second series of holes at a material exit area of the body and the support positionable in a vibratory separator so that the material exit area is adjacent a location of material exit from the vibratory separator,
the second opening size smaller than the first opening size,
the first series of first holes comprising a plurality of first lines of first holes, the first lines parallel to each other, the first holes of each of the first lines spaced-apart from each other a first distance,
the second series of second holes comprising a plurality of second lines of second holes, the second lines parallel to each other, the second holes of each of the second lines spaced-apart from each other a second distance, in end with no first holes interspersed among the second holes, and with no second holes interspersed among the first holes,
the plurality of first lines numbering more than the plurality of second lines,
the first lines and the second lines extending across the body from the first side to the second side, the first lines and the second lines positioned so that material introduced onto the material introduction area of the body can initially encounter the first holes of the first lines.

25. A plastic grid for fusing together layers of screening material of a screen assembly of a vibratory separator, the plastic grid comprising
a body with two pairs of opposed sides including a first pair with a first aide parallel to a second side and a second pair with a third side parallel to a fourth side,
a first series of first holes through the body, each of the first series of first holes having a first opening size as viewed from above,
a second series of second holes through the body, each of the second series of second holes having a second opening size as viewed from above,
the second series of second holes at a material introduction area of the body and the support positionable in a vibratory separator so that the material Introduction area is adjacent a location of material introduction to the vibratory separator,
the second opening size smaller than the first opening size,
the first series of first holes comprising a plurality of first lines of first holes, the first lines parallel to each other, the first hales of each of the first lines spaced-apart from each other a first distance,
the second series of second holes comprising a plurality of second lines of second holes, the second lines parallel to each other, the second holes of each of the second lines spaced-apart from each other a second distance, and with no first holes interspersed among the second holes, and with no second holes interspersed among the first holes,
the plurality of first lines numbering more than the plurality of second lines,
the first lines and the second lines extending across the body from the first side to the second side, the first lines and the second lines positioned so that material introduced onto the material introduction area of the body can initially encounter the second holes of the second lines.

26. A vibratory separator with a screen assembly mounted thereto, the screen assembly comprising a support, the support comprising
a body with two pairs of opposed sides including a first pair with a first side parallel to a second side and a second pair with a third side parallel to a fourth side,
a first series of first holes through the body, each of the first series of first holes having a first opening size as viewed from above,
a second series of second holes through the body, each of the second series of second holes having a second opening size as viewed from above,
the second series of second holes at a material introduction area of the body and the support positionable in a vibratory separator so that the material introduction area is adjacent a location of material introduction to the vibratory separator,
the second opening size smaller than the first opening size,
the first series of first holes comprising a plurality of first lines of first holes, the first lines parallel to each other, the first holes of each of the first lines spaced-apart from each other a first distance,
the second series of second holes comprising a plurality of second lines of second holes, the second lines parallel to each other, the second holes of such of the second lines spaced-apart from each other a second distance, end with no first holes interspersed among the second holes, and with no second holes interspersed among the first holes,
the plurality of first lines numbering more than the plurality of second lines, and
the first lines and the second lines extending across the body from the first side to the second side, the first lines and the second lines positioned so that material introduced onto the material introduction area of the body can initially encounter the second holes of the second lines.

27. The vibratory separator of claim 26 wherein the vibratory separator is a shale shaker.

28. A method for treating material with a vibratory separator, the method comprising introducing material to be treated to a vibratory separator, the vibratory separator comprising a support, the support comprising a body with two pairs of opposed sides including a first pair with a first side parallel to a second side and a second pair with a third side parallel to a fourth side, a first series of first holes through the body, each of the first series of first holes having a first opening size as viewed from above, a second series of second holes through the body, each of the second series of second hales having a second opening size as viewed from above, the second series of second holes at a material introduction area of the body and the support positionable in a vibratory separator so that the material introduction area is adjacent a location of material introduction to the vibratory separator, the second opening size smaller than the first opening size, the first series of first holes comprising a plurality of first lines of first holes, the first lines parallel to each other, the first holes of each of the first lines spaced-apart from each other a first distance, the second series of second holes comprising a plurality of second lines of second holes, the second lines parallel to each other, the second holes of each of the second lines spaced-apart from each other a second distance, and with no first holes interspersed among the second holes, and with no second holes interspersed among the first holes, the plurality of first lines numbering more than the plurality of second lines, and the first lines and the second lines extending across the body from the first side to the second side, the first lines and the second lines positioned so that material introduced onto the material introduction area of the body initially encounters the second holes of the second lines, and separating components of the material with the vibratory separator.

* * * * *